US011849196B2

(12) United States Patent
Parmar et al.

(10) Patent No.: US 11,849,196 B2
(45) Date of Patent: Dec. 19, 2023

(54) AUTOMATIC DATA EXTRACTION AND CONVERSION OF VIDEO/IMAGES/SOUND INFORMATION FROM A SLIDE PRESENTATION INTO AN EDITABLE NOTETAKING RESOURCE WITH OPTIONAL OVERLAY OF THE PRESENTER

(71) Applicant: Educational Vision Technologies, Inc., La Jolla, CA (US)

(72) Inventors: Monal Mahesh Parmar, San Diego, CA (US); Jason John Bunk, Camarillo, CA (US)

(73) Assignee: EDUCATIONAL VISION TECHNOLOGIES, INC., La Jolla, CA (US)

( * ) Notice: Subject to any disclaimer, the term of this patent is extended or adjusted under 35 U.S.C. 154(b) by 735 days.

(21) Appl. No.: 17/019,190

(22) Filed: Sep. 11, 2020

(65) Prior Publication Data
US 2021/0076105 A1    Mar. 11, 2021

Related U.S. Application Data

(60) Provisional application No. 62/899,092, filed on Sep. 11, 2019.

(51) Int. Cl.
| G10L 15/26 | (2006.01) |
| H04N 21/854 | (2011.01) |
| G06F 40/169 | (2020.01) |
| G06F 3/048 | (2013.01) |

(52) U.S. Cl.
CPC .......... *H04N 21/854* (2013.01); *G06F 3/048* (2013.01); *G06F 40/169* (2020.01); *G10L 15/26* (2013.01)

(58) Field of Classification Search
CPC ...................................... G10L 15/26
See application file for complete search history.

(56) References Cited

U.S. PATENT DOCUMENTS

2004/0263636 A1* 12/2004 Cutler ..................... H04N 7/15
348/211.3
2014/0372877 A1* 12/2014 Snyder ................. G06F 40/106
715/254

* cited by examiner

*Primary Examiner* — Ibrahim Siddo
(74) *Attorney, Agent, or Firm* — Jonathan Kidney; Intelink Law Group, P.C.

(57) ABSTRACT

A method and system to automatically convert a presentation with slide materials to a digitized notetaking resource, by inputting a media stream from a presentation to a compute server, converting the media stream by segmenting the video into smaller segments, transcribing audio of the presenter's speech into text. Time stamp metadata is associated to elements of the segmented video (and, if available, slide data), audio, and transcribed text, and the elements are time ordered. A user interface is provided displaying elements of the segmented video/slide data and transcribed text. The user interface enables playback of the elements of the segmented video/slide data, audio of the presenter's speech, and transcribed text, wherein playback items are time-matched. Different times can be selected by a user, wherein the selected elements are made prominent in the display, with the audio of the presenter's speech also being time-matched to the selection.

34 Claims, 18 Drawing Sheets

AUTOMATIC DATA EXTRACTION AND CONVERSION OF VIDEO/IMAGES/SOUND INFORMATION FROM A SLIDE PRESENTATION INTO AN EDITABLE NOTETAKING RESOURCE WITH OPTIONAL OVERLAY OF THE PRESENTER

CROSS-REFERENCE TO RELATED APPLICATION(S)

This application is non-provisional conversion claiming the benefit and priority of U.S. Provisional Patent Application No. 62/899,092, titled "Automatic Data Extraction and Conversion of Video/Images/Sound Information from a Slide Presentation into an Editable Notetaking Resource with Optional Overlay of the Presenter," filed Sep. 11, 2019, the contents of which is hereby incorporated by reference in its entirety.

FIELD

This invention relates to slide presentation conversion technology. More particularly, it relates to the automatic digitization and conversion of "videoed" lectures with slide presentation materials into a searchable and linkable notes or study resource.

BACKGROUND

Most classes or presentations involve the lecturer illustrating with a slide presentation the concepts being discussed. Typically, the slide presentation images are printed out as a handout to the listener, wherein the listener makes writes on it or in a "notebook" or computer. Because of this, the listener must rapidly take notes which can be fraught with mistakes from sloppy note-taking skills. Conventional approaches to solving this problem has been audio recordings where the listener/student later revisits the recordings to reconcile his/her notes. Other options are to review a video tape of the lecture and similarly deconstruct the lecture material into study notes. Of course, these approaches are very labor and time intensive and fails to exploit the advances in the various fields of image-to-text capture, meta-data embedding, and searchable data.

In view of the above challenges, various systems and methods are described below that enable a presenter's presentation, including slide presentation materials, to be automatically be converted into a digitized, meta-searchable notetaking resource, with audio and illustrated concepts linked together. These and other capabilities are detailed below.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form as a prelude to the more detailed description that is presented later.

In one aspect of the disclosed embodiments, a method to automatically convert a presentation with slide materials to a digitized notetaking resource, comprising: inputting a media stream from a presentation to a compute server, the media stream containing a video of the presentation and an audio of the presenter's speech; performing a conversion of the media stream into a notetaking resource, the conversion comprising: segmenting the video into smaller segments; transcribing audio of the presenter's speech into text; associating a time stamp metadata to elements of the segmented video, the audio, and the transcribed text; and time ordering the elements of the segmented video, audio, and transcribed text; generating a composite user interface to view the notetaking resource, with one or more display panes, the interface having audio output controls; displaying in the one or more display panes, elements of the segmented video and transcribed text; and enabling a playback of the elements of the segmented video, audio of the presenter's speech, and transcribed text; wherein the displayed elements of the segmented video, audio of the presenter's speech, and transcribed text are time-matched, and wherein different times in the elements of the segmented video and transcribed text are selectable by a user, the selection causing the selected elements to be made prominent in the one or more display panes, with the audio of the presenter's speech also being time-matched to the selection.

In another aspect of the disclosed embodiments, the above method is provided, wherein the video of the presentation includes images of presentation slides; and/or wherein the media stream further includes slide data from a slide presenting device; and/or further comprising: associating a time stamp metadata to elements of slide data; time ordering the elements of the slide data; displaying in the one or more display panes, elements of the slide data; and enabling a playback of the elements of the slide data, wherein the displayed elements of the slide data are time matched to at least one of a displayed elements of the segmented video and transcribed text, and when a different time selection is made by the user; and/or wherein a first pane of the one or more display panes is a view of the elements of the slide data and a second pane of the one or more display panes is a view of the elements of the transcribed text; and/or further comprising, concurrently displaying a plurality of elements of the segmented video in a video pane of the one or more display panes; and/or further comprising, displaying a plurality of elements of the transcribed text in a text pane of the one or more display panes; and/or further comprising embedding an image of a presenter in the displayed elements of the slide data; and/or wherein if the presenter overlaps with content of a videoed slide, making the presenter transparent; and if the presenter does not overlap with content of the videoed slide content, then embedding the presenter into spaces by at least one of identifying empty space in the content, extending a slide width, and moving separate videoed slides from each other to place the presenter; and/or further comprising: detecting in the video, if viewable, a presenter; and if the presenter overlaps with content of a videoed slide, making the presenter transparent; and if the presenter does not overlap with content of the videoed slide content, then embedding the presenter into spaces by at least one of identifying empty space in the content, extending a slide width, and moving separate videoed slides from each other to place the presenter; and/or further comprising: detecting in the video, if viewable, a presenter; and at least one of automatically reorientating the detected presenter to match a presenter's pointing gesture to scenery content which semantically corresponds to the transcribed text, and changing a dynamic perspective to focus to a head shot, an upper body shot, a partial or full body shot of the presenter based on a time duration, presentation, topic or punctuation; and/or further comprising, at least one of automatically reorientating the detected presenter to match a presenter's pointing gesture to scenery content which semantically corresponds to the transcribed text, and changing a dynamic perspective to focus to a head shot, an upper body shot, a partial or full body shot of the presenter based on a slide time duration, presentation, topic or punctuation; and/or, further comprising tracking a position of the presenter and adjusting a displayed view to maintain the presenter within the displayed view; and/or wherein being made prominent is achieved by at least one of highlighting, altering an appearance, altering a size, altering a color, and altering a position within the one or more display panes; and/or further comprising, altering a portion of at least one of the elements of the segmented video and transcribed text, by at least one of simulating a laser pointer highlighting on the portion, rendering an animation pointing to the portion, and altering a color, type, size or characteristic of the portion; and/or further comprising, altering a portion of at least one of the elements of the slide data and transcribed text by at least one of simulating a laser pointer highlighting on the portion, rendering an animation pointing to the portion, and altering a color, type, size or characteristic of the portion; and/or further comprising creating a slide data corresponding to the transcribed text; and/or further comprising, placing thumbnails of different at least one of the elements of the video and elements of the slide data, in the one or more display panes; and/or further comprising, simultaneously displaying elements of the video, the transcribed text and the slide data in the one of more panes; and/or providing a user level text editing capability in the notetaking resource, allowing the user to add their own notes; and/or providing a user level text editing capability in the notetaking resource, allowing the user to add their own notes; and/or further comprising a word or topic search capability within the transcribed text; and/or further comprising, adding visible annotators in the one or more display panes, to allow the user to control at least one of zoom, fast forward, reverse, scroll down, scroll up, page up, page down, collapse, open, skip, volume, time forward, and time back; and/or, further comprising, during playback, highlighting time-matching elements of at least one of the transcribed text and the slide data; and/or further comprising, automatically generating questions from at least one of the transcript, the slide data, and presenter-provided data; and/or further comprising testing a user with the generated questions; and/or further comprising: detecting in video of the presentation, writing on a writing surface; at least one of removing artifacts and enhancing the writing; identifying at least one of key frames and key groups in the writing; associating a time stamp metadata to one or more elements of the at least one key frames and key groups; time-ordering the one or more elements of the at least one key frames and key groups; and displaying in the one or more display panes the time-ordered one or more elements of the at least one key frames and key groups; and/or further comprising: detecting in video of the presentation, writing on a writing surface; at least one of removing artifacts and enhancing the writing; identifying at least one of key frames and key groups in the writing; associating a time stamp metadata to one or more elements of the at least one key frames and key groups; time-ordering the one or more elements of the at least one key frames and key groups; and displaying in the one or more display panes the time-ordered one or more elements of the at least one key frames and key groups; and/or further comprising, at least one of creating slide data from, enhancing, and animating one or more elements of the at least one key frames and key groups transcribed text or the transcribed text.

In yet another aspect of the disclosed embodiments, a system to automatically convert a presentation with slide images to a digitized notetaking resource is provided, comprising: a compute server with software modules to convert input video, digital media and audio streams into a notetaking resource, comprising: a media analysis system containing a digital media analysis system module and at least one of a room analysis/other foreground detection module, writing surface detection module, person detector module, and writing detection/OCR module, and receiving input from images selected for analysis and AV feeds; a slide platform generation system module comprising: a presentation interval/slide element generator receiving input from the media analysis system and from images selected for analysis; a presenter embedding/slide element modulator module receiving input from the media analysis system and the presentation interval/slide element generator module; a slide element enhancement module receiving input from the presenter embedding/slide element modulator module; and a presenter enhancement/replacement module receiving input from the slide element enhancement module, wherein an output of the slide element enhancement module is slide elements/metadata data, and outputs of the presenter enhancement/replacement module is extracted/enhanced presenter data and slide elements with presenter embedded/metadata data, wherein all the output data is time stamped and comprise elements of the notetaking resource.

In yet another aspect of the disclosed embodiments, the above system is provide, further comprising a composite user interface with one or more panes for displaying elements of the notetaking resource in a time ordered manner; and/or further comprising, a distribution server providing a user access to the notetaking resource; and/or further comprising, a video+audio muxer joining the input video, digital media and audio streams to form a single multimedia signal; and/or further comprising, a microphone device, video camera device, and display device, the devices providing input data for the video, digital media and audio streams.

Other aspects and embodiments are described below.

DETAILED DESCRIPTION

Figure 1:
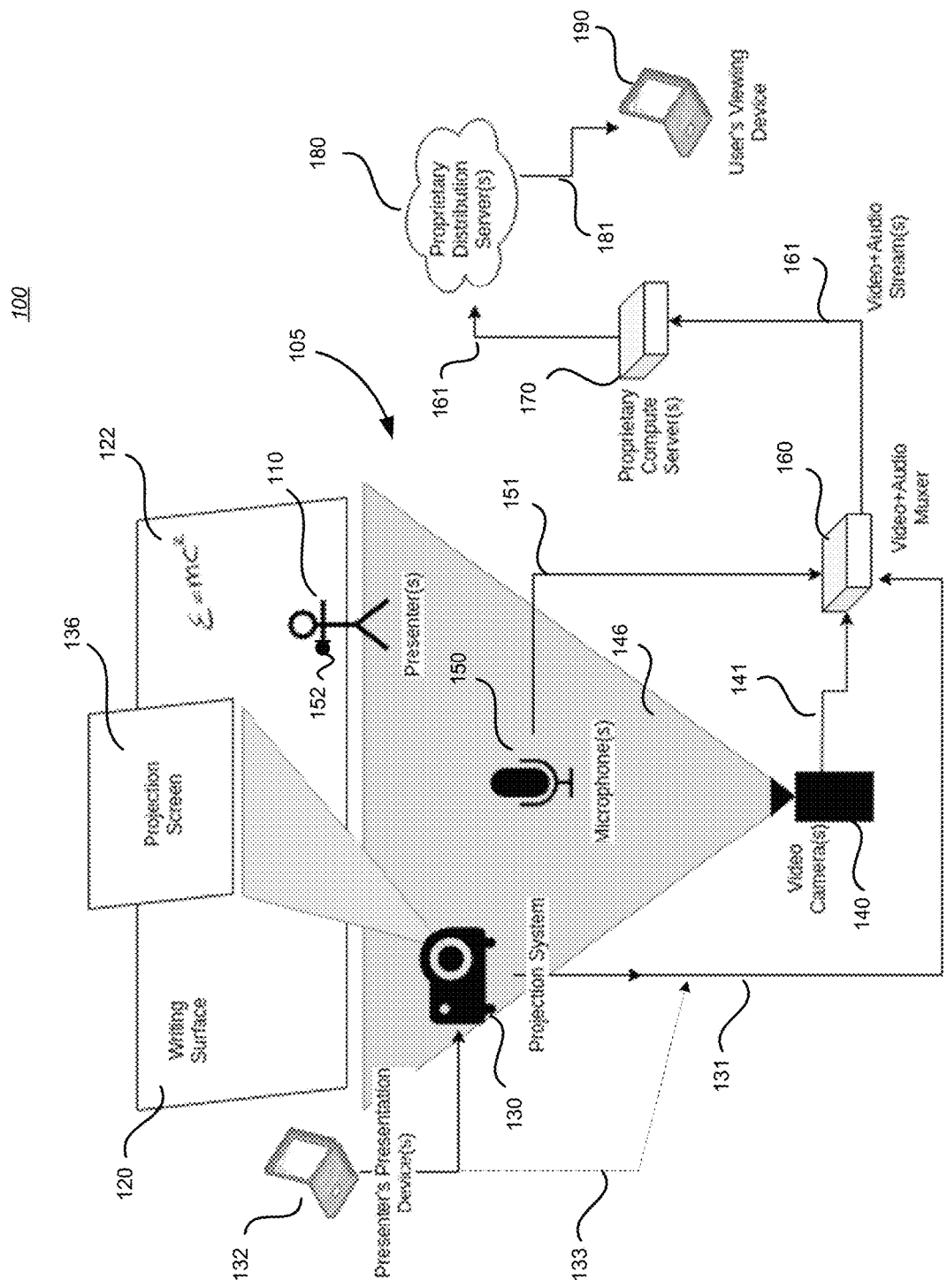
FIG. 1 is an illustration of a "hardware" configuration for one possible embodiment of an exemplary system.

Various features are described below, which, in some embodiments can be used independently or in combination with other features from other embodiments. These described embodiments are not to be construed as the only modes or embodiments possible, but are presented here to help explain how some of the inventive features are implemented.

Preliminary Definitions

CNN: Convolutional Neural Network, which here is used as an example of an algorithm that can start with an input image, and output another image in which each pixel represents a desired quantity (e.g., a vector direction, or a multiclass classification/ranking such as "which mathematical symbol of a set of 500 symbols is most likely"). They may have an advantage of processing using multiple scales of features (from small local patches of pixels e.g., 7×7 pixels, to large patches e.g., 150×150). Other examples of similarly behaving algorithms include e.g., structured random forest, or simpler feature detector filters such as corner detectors, edge/ridge detectors, or difference-of-gaussians. It can also be a combination of such algorithms (e.g., ridge detection then gaussian blur, which is a basic estimate of writing density).

OCR: Optical Character Recognition. General idea of extracting text from an image, includes subtasks such as detecting lines on a page, detecting words within each line, and converting words into text (e.g., to Unicode).

Writing: any markings intentionally left on the writing surface by the presenter. Includes text (i.e., words and/or mathematics), drawings, diagrams, etc.

Key frames: are specially generated images which collectively contain all or nearly all of the written information from the video. Key frames are used to gather writing for the notes document.

Key groups: can be any fraction of the writing or of the Key frames.

Introduction

From a top-level perspective, the exemplary system generates an interconnect learning platform by autonomously generating high value study material and metadata which enables novel information access efficiencies. It replaces human notetakers by an automated process which generates notes from slide or other presentations. For example, the exemplary system can take in input data in the form of raw camera feeds, audio feeds, and audio/visual (A/V) device feeds and transforms this data into study materials and metadata to populate a learning platform. The exemplary system analyzes, curates, enhances, and organizes the input data to generate searchable assets and metadata.

In various embodiments, the exemplary system digitizes and captures the entire field of view of the slide presentation, visual aids, and audio and processes the data to perform one or more of:

a. Extracts, analyzes, organizes, and makes searchable, elements such as:
   i. The presenter: including gestures and pointing devices.
   ii. Audio sources: including spoken remarks of importance or digressions, and audio from presented multimedia.
   iii. Written material: including equations, sample problems, figures/diagrams, on either presentation surfaces or projected surfaces.
   iv. Projected content: including slide information (e.g., bullet points, figures/diagrams, video clips or animations therein) and textual material from electronic (e.g., tablet writing) or physical notes/documents (e.g., document scanners/cameras).

The exemplary system also can enhance the projection screen video to make the level of perceptual quality equivalent to capture card. For example, one or more embodiments can:

a. Directly capture A/V device feed using capture card.
b. Process projection screen or capture card videos to segment time based on duration spent on individual slides or type of content such as video, web surfing, interacting with software, etc.
c. Match and replace captured intervals with originating slides, documents, or media.
d. For Intelligent presenter placement: Modulate content in each individual slide to make space for the segmented presenter to be embedded into their own slide. Scale of presenter can be maximized while amount of modulation is minimized. There is an option to optimization across all sides to make the location of the presenter spatially consistent.
e. Generate novel metadata for the elements such as when writing or content is written or shown.
f. Convert the writing from captured and originating media into alphanumeric and domain specific symbols and parses originating media to extract metadata about symbols, inner media, and words.
g. Transcribe speech into text, with timestamping metadata for when words or phrases are spoken.
h. Use topic modeling to map machine-recognized elements to semantic concepts; concepts are mapped in a curated concept space (curated by machine learning or human-augmented mapping).
i. Organize groups of visual elements to generate a document of variable height and width.

j. Connect elements with semantically related content in the system's database.

k. Populate an online platform that enables users to quickly navigate and effectively absorb information within the video and semantically related information in the exemplary network.

l. Sync generated material together so that any piece of content indexes another by time, e.g., clicking on word in transcript or character in generated document the user to the point in the video where that word was spoken or character was written.

For static (no animations) presentation slides, embodiments of the exemplary system can estimate timestamp metadata for bullet points and images on the static slide by association with other elements such as speech transcription (via semantic concept association), cursors or pointing devices, or other elements.

For dynamic slides with animations or elements appearing in parts over time, embodiments of the exemplary system can generate timestamping metadata for each element as they appear.

In various embodiments, the exemplary system can dynamically show relevant intervals of each content as time progresses while allowing the user to control what region they wish to see, e.g., As an enhanced video of slide 4 is playing the user can scroll to any other slide.

In various embodiments, the exemplary system can have the ability to dynamically generate a platform view interface based on duration, purpose, and type of apparatus usage/interaction. For example, a video viewer when the presentation is primarily a video; a slides viewer when the presentation is primarily projected slides; a notes viewer when the presentation is primarily written or projected notes; or hybrid/mixed views thereof.

Element extraction, processing, and presentation may be performed at the end or after the presentation; or may be live during the presentation to enable interaction with the elements and how they are being processed.

These and other capabilities are presented in the following Figs.

FIG. 1 is an illustration of a "hardware" configuration for one possible embodiment 100 of an exemplary system. For the purposes of illustration, the exemplary embodiment 100 is cast in the context of a classroom 105 wherein presenter(s) or lecturer(s) 110 is using a writing surface(s) 120 or projection screen(s) 136. The exemplary system, from a "capture" perspective, utilizes one or more of image displaying devices, shown here as projector(s) 130 or presentation device(s)/laptop 132, for example; one or more audio input sensors, shown here as microphone 150 or lecturer(s)' microphone 152 (typically wireless), for example; and one or more video capturing devices, shown here as video camera(s) 140, for example. Projection screen(s) 136 may be an inert surface or an electronic display (e.g., TV monitor, or like). Therefore, projector(s) 130 may be optional, being unnecessary wherein presentation device(s)/laptop 132 may drive the electronic display. Other combinations or devices for presenting an image are well known in the art and are understood to be within the scope of this embodiment 100. As one possible example, presentation device(s)/laptop 132 may be optional, wherein projector 130's image is generated from another device (not shown) such as a smart device, tablet, etc. by the lecturer(s) 110 that streams an image to the projector(s) 130 or to the projection screen(s) 136 or to an electronic display version of the projection screen(s) 136.

While the above choices of devices are described, the demonstrative implementation will be described in the context of a "slide" presentation show (or an equivalent to what is typically referred to as a "slide show" or via overlays using an overhead projector—understanding that electronic versions such as Powerpoint® (owned by Microsoft Corporation), Google Slide (owned by Alphabet Corporation), etc. are proxies thereto). Accordingly, other formats and types of materials that provide a pre-prepared presentation also possible.

In the embodiment of FIG. 1, video camera(s) 140 are positioned to have a field of view 146 sufficient enough to capture one or more portions of the presentation display (120, 136) and the lecturer(s) 110, if so desired. For example, if the lecturer(s) 110 writes on the writing board 120 the formula $E=mc_2$ (122), it will be captured by the camera(s) 140. In some instances, overlapping fields of view may be utilized to provide a more comprehensive image capture (e.g., one camera's field of view may be blocked by the lecturer(s) 110 (or other object), which may be captured in another camera's field of view). In other embodiments, the camera(s) 140 may be mobile, or alter their field of view, as needed. In yet other embodiments, the camera(s) 140 may have a variable aperture and zoom capabilities. As a non-limiting example, one or more camera(s) 140 may track the lecturer(s) 110 as they move along the face of the writing surface 120 and/or may "zoom" into writings, etc.

Microphone(s) 150 (or lecturer(s)' microphone 152) may be multiply located or distributed, according to the acoustics of the classroom 105, or other recording metrics. In some embodiments, the video camera(s) 140 may have sufficient enough audio recording capabilities to negate the need for separate microphones 150 (or 152), or the video-mics may supplement microphone(s) 150 (or lecturer(s)' microphone 152).

The outputs 131, 133, 141, 151 (152's wireless) of the appropriate image (video) and sound (audio) devices can be optionally merged into a video+audio muxer 160. Outputs 131, 133, 141, 151 may be wired and/or wireless. Muxer 160 may be on-site or off-site. More than one Muxer 160 may be used. Output 161 of muxer 160 containing the A/V data is fed to one or more compute server(s) 170 (which processes the input A/V data into a user-consumable form) and relays it via link 161 to distribution server(s) 180 which may be resident on a proprietary or non-proprietary network, typically deployed in the form of an information cloud. The lecture information (now processed into a digital notetaking resource) on the distribution server(s) 180 then can be accessed by a user's device 190 via wired or wireless link 181. Details of the processing steps to arrive at the searchable notetaking resource are presented in the subsequent Figs.

In a commercial scenario, the institution sponsoring the lecture or presentation may provide the recording devices, while the conversion entity can provide the compute server, conversion software and video camera(s), if needed. The conversion entity is understood to be the party providing the "service" of automatically converting the input video/audio/data into a notetaking resource(s) that the students or audience can utilize. The distribution server(s) and user devices can be 3rd party devices that "link" into the notetaking resource. However, it is understood that in most scenarios, the recording capabilities of conversion entity's devices (and distribution server(s)) may be tailored for this purpose and therefore better facilitate accurate data conversion into the notetaking resource(s). For example, a higher quality video feed, significantly larger capture areas, local device processing to decrease latency, and superior raw data processing capabilities may be achieved with conversion entity-sourced devices, if so desired. Of course, each party (institution, conversion entity) may, depending on implementation preference, negotiate which specific hardware is institution-sourced versus conversion entity-sourced As should be apparent, variations to the above configuration including types of devices, servers, locations, etc. may be implemented without departing from the spirit and scope of this disclosure. Examples of some possible variations are:

Microphone(s) 150, 152:
  a. A microphone held by each presenter, or one shared and passed between presenters.
  b. One or more microphones mounted in a fixed position (e.g., attached to ceiling, or on a tripod stand) somewhere in the room.
  c. One or more microphones used by the audience.

Writing Surface(s) 120: There may be multiple writing surfaces, and they may be of different types (e.g., whiteboards, chalkboards, glass boards, digital surfaces, etc.). The Writing Surface 120 may be a visualization of a "slide" projection and the lecturer may write on a projectable surface (e.g., overhead transparency, digital laptop or tablet that is writable using a stylus, mouse, or equivalent, etc.) of which is replicated or displayed on the Writing Surface 120 for viewing by the audience.

Presenter's presentation device(s) 132: May be one or more audio/video sources used by the presenter (to display/distribute to the audience) whose presentation stream can be intercepted and captured; such as document cameras, a laptop screen, a computer, a digital writing surface, overhead transparency, Digital proxy to a slide presentation (non-limiting examples being PowerPoint®, Google Slides®), virtual reality (VR) headset, etc.

Video+Audio Muxer 160 and the Compute Server(s) 170:
  a. These can be the same physical machine with the "connection" between them as possibly software.
  b. There could be multiple 'Video+Audio Muxers' between one or more A/V feed(s) and the one or more Compute Server(s).

Compute Server(s) 170 and Distribution Server(s) 180:
  a. The Compute Server(s) and Distribution Server(s) may be the same physical machine and may be reconfigurable as needed. For, example they may be located geographically near to the presentation facility, distributing content locally for efficient live streaming to audience members, while also uploading to a remote server for long term or remote distribution.
  b. The Compute Server(s) can be geographically located nearby (e.g., within the same physical room as the Video Camera(s)), or it may be in a separate room or a remote server.

Video Camera(s) 140:
  a. There may be more than one video camera (e.g., pointing at different walls) or more than one projector (e.g., a large room with multiple screens).
  b. In some embodiments, the video stream can be pre-recorded video—either original or enhanced (entire or portions thereof) and the system can perform the data extraction and "products" as described above "post-presentation."

Projection System(s) 130 and Projection Screen(s) 136:
  a. Could be replaced by one or more television, video screens, or other display or media distribution mechanisms such as a stream that audience members connect to wirelessly with their device; e.g., a webcast stream by their laptop, or a VR scene streamed to audience VR headsets. Also, the Projection System(s) 130 and Projection Screen(s) 136 can display the presentation images using a conventional "slide" presentation software program running on a computer or digital device, the output of which is projected or displayed on a screen(s) in the room (or even directly to an audience member). The content stream is captured (using software on presenter's machine or an intercepting capture box/card between presenter's device and display device or user device) and is redistributed later, with enhancements as discussed below.
  b. The connection between Projection System and Video+Audio Muxer may take many forms (e.g., HDMI splitter/capture cards, Wi-Fi, USB, etc.); it represents a general connection between a projection system and the exemplary muxing/compute machine(s).
  c. Video stream(s) captured directly from the Projection System(s) can enable a detecting and indexing of elements of the projected presentations. Alternatively, the detecting and indexing can be achieved from the video camera(s) feed, as an indirect approach, or the video stream can be a pre-recorded video—either original or enhanced (entire or portions thereof) and the exemplary system can perform the data extraction and products as described herein. In a commercial embodiment, the exemplary system utilizes direct capture from the Projection System(s), for "best" video quality
  d. Projection Screen(s) and Presenter(s)/Lecturer(s) can be processed as foreground distractors which can be ignored by an exemplary writing surface analysis system (which can provide writing enhancement and writing indexing, as further detailed below).
  e. Presenter's presentation device(s) and user's viewing devices may be any sort of computer device (e.g., a phone, tablet, laptop, VR device, etc.).

As noted above, the above examples are simply examples showing different possibilities for hardware configuration, etc. and it is expressly understood that other examples, modifications and variations are within the purview of one of ordinary skill in the art.

Figure 2:
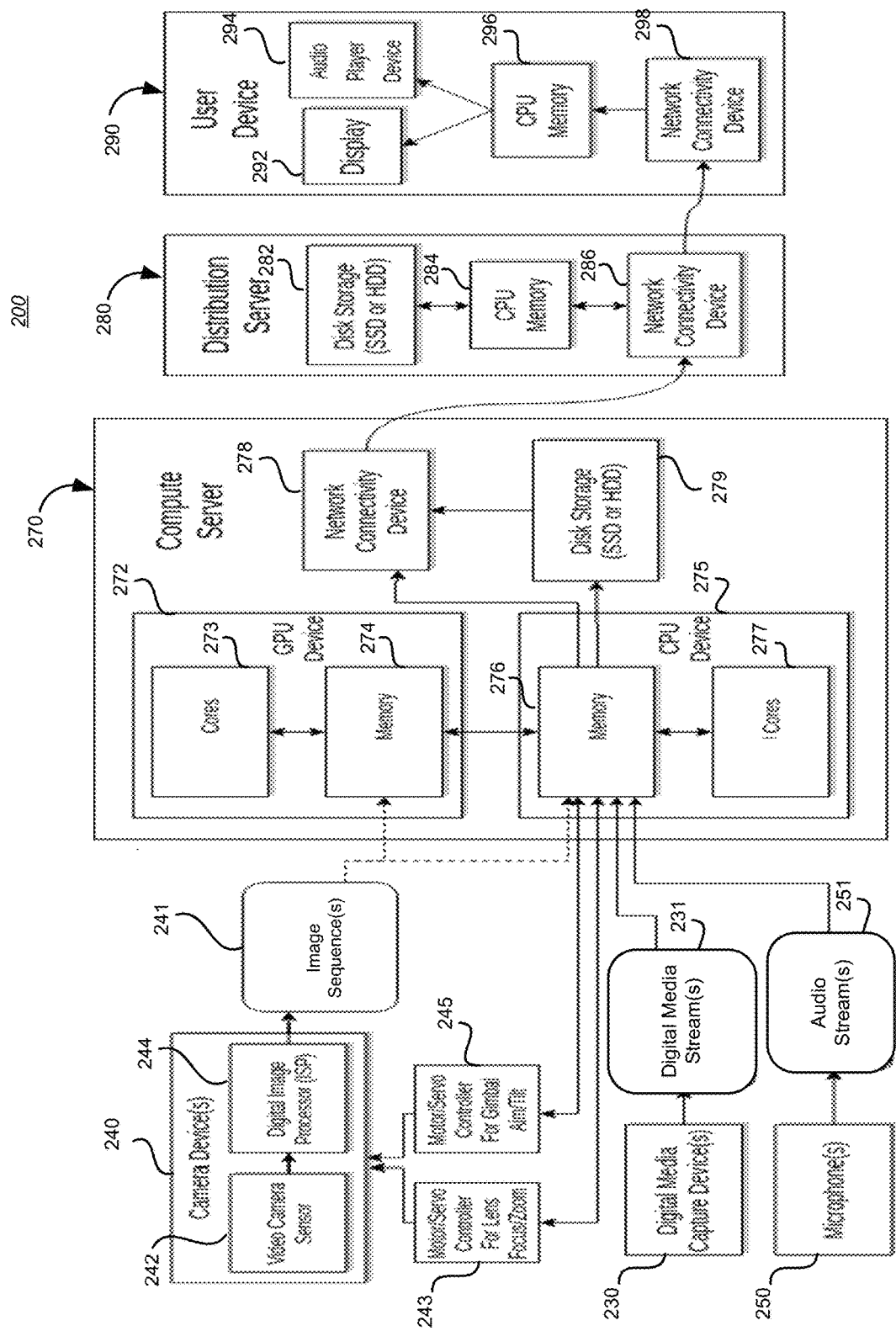
FIG. 2 is an illustration showing additional details that may be in the exemplary hardware devices of FIG. 1.

FIG. 2 is an illustration 200 showing additional details that may be in the exemplary hardware devices of FIG. 1.

Camera Device(s) 240 will contain a video camera sensor(s) 242 which is fed to an Image Processor 244, an output of which is externally conveyed by a high-bandwidth channel 241 (non-limiting examples being USB, etc.). Of course, in some embodiments, the output may be conveyed wirelessly. Camera Device(s) 240 may have a servo controller 243 for lens manipulation as well as variable aim/tilt 245 capabilities.

Digital Media Capture Device(s) 230 can have its output externally conveyed by a video streaming channel 231 (non-limiting examples being USB, etc.). Of course, in some embodiments, the output may be conveyed wirelessly.

Audio sensor(s) or Microphone(s) 250 can have its output externally conveyed by audio streaming channel 251 (non-limiting examples being USB, etc.). Of course, in some embodiments, the output may be conveyed wirelessly.

Outputs of the various sensors is conveyed to a Compute Server(s) 270 which houses or directs the respective outputs to a Graphics Processor(s) (GPU) 272 and Central Processor(s) (CPU) 275, for appropriate application of algorithms to the image-sound-data to perform the desired data extraction and conversion to the notetaking resource product(s). As is apparent, some GPU 272 and CPU 275 modules may have independent memories (274, 276, respectively) as well as independent cores (274, 277, respectively). Outputs of the processed information is forwarded to "local" disk/storage resources 278 and/or forwarded to Network Connectivity Device 278 for transmission to the Distribution Server 280's Network Connectivity Device 286.

Distribution Server 280 can contain one or more storage 282 (non-limiting examples being Solid State Drive (SSD) or Hard Disk Drive (HDD)) which stores the notetaking resource product(s) for consumption by a user. As is apparent, various CPU/Memory 284 may operate with the Distribution Server to manage the storage 282 and also received data as well as the transmission of that data via Network Connectivity Device 286 (in original or altered form—e.g., compressed, encrypted, partitioned per subscription level, and so forth) to the User Device 290. Accounting services, user login, administrative and other such management services may be managed within the Distribution Server 280, if so desired.

User Device 290 can contain a Display 292, Audio Player (outputting sound) 294, CPU/Memory 296 and associated Network Connectivity Device 298. User Device 290 may be a general purpose computer, laptop, tablet device, smartphone, and so forth and is understood to be the user's digital appliance for viewing or "consuming" the notetaking resource product(s).

Further optional or different configurations with respect to the embodiments of FIGS. 1-2 are discussed below, noting different ways to perform the analysis of and modification of the raw data are presented. For example:

a. Directional arrows may be bi-directional, according to implementation preference.

b. If the video/audio muxing is to be done by the Compute Server 270 (as implied in FIG. 2), and there is more than one microphone source, voice analysis can be used to mix whichever microphone contains the clearest current speech with each video. If the muxer is outside the Compute Server 270 (as shown in FIG. 1), such voice analysis may not be relevant (e.g., multi-microphone mixing may have been done by resident circuitry).

c. The Digital Media Capture Device(s) 230 may provide audio (e.g., from the presenter's computer, for example), which can be mixed.

d. The GPU 272 could be a neural network coprocessor—that is, media data is collected in general-purpose CPU memory 276, then parts of it (e.g., one image frame at a time or frame samples from a video) are fed to the neural network coprocessor to be processed by parallel algorithms. In general, it is very useful to have some kind of coprocessor (e.g., GPU, neural network coprocessor, or Field Programmable Gate Arrays (FPGA)) that can run highly parallelizable algorithms, which is often the approach in vision processing or audio processing.

e. The computational coprocessor can physically reside on whatever machine is running the intensive algorithms of the media analysis/compute server subsystems. It may be physically near the camera 140 (as implied by FIG. 1) or may be a shared remote server (physically in a different room than the camera/microphone 140/150) in which case there can be a network connectivity device in between (e.g., an ethernet cable or WiFi connection). Then the only devices in the room with the camera/microphone 140/150 may be the Muxer 160 (a device which can accept audio/video signals and pass them along to the Compute Server 170 (e.g., via a network connection)). Of course, in some sensor systems, the camera 140 and microphone 150, for example, may have post-processing already done on them via the sensor internal systems to convert them to a transmittable digital signal without the need for muxing.

f. The Distribution Server 280 can be a remote server with wired or network connections.

g. If multiple Computer Servers 270 are utilized, their inter-data communication can be via a network connection.

h. User devices 290 may be configured to not have audio players, or in silent mode if audience devices are of a form that is silent.

i. The terms "image sequence" and "video" can be used interchangeably, understanding that a video is a sequence of images.

The above examples are simply examples showing different possibilities and it is expressly understood that other examples, modifications and variations are within the purview of one of ordinary skill in the art. As a non-limiting example, some aspects of the hardware and/or data flow may be merged into a single stream or other multiple streams. Or the sponsoring institution may facilitate the lecture-side hardware and data streams, where the conversion entity performs the notetaking conversion on the provided information. Therefore, these and other changes are understood to be within the scope of this disclosure.

Figure 3:
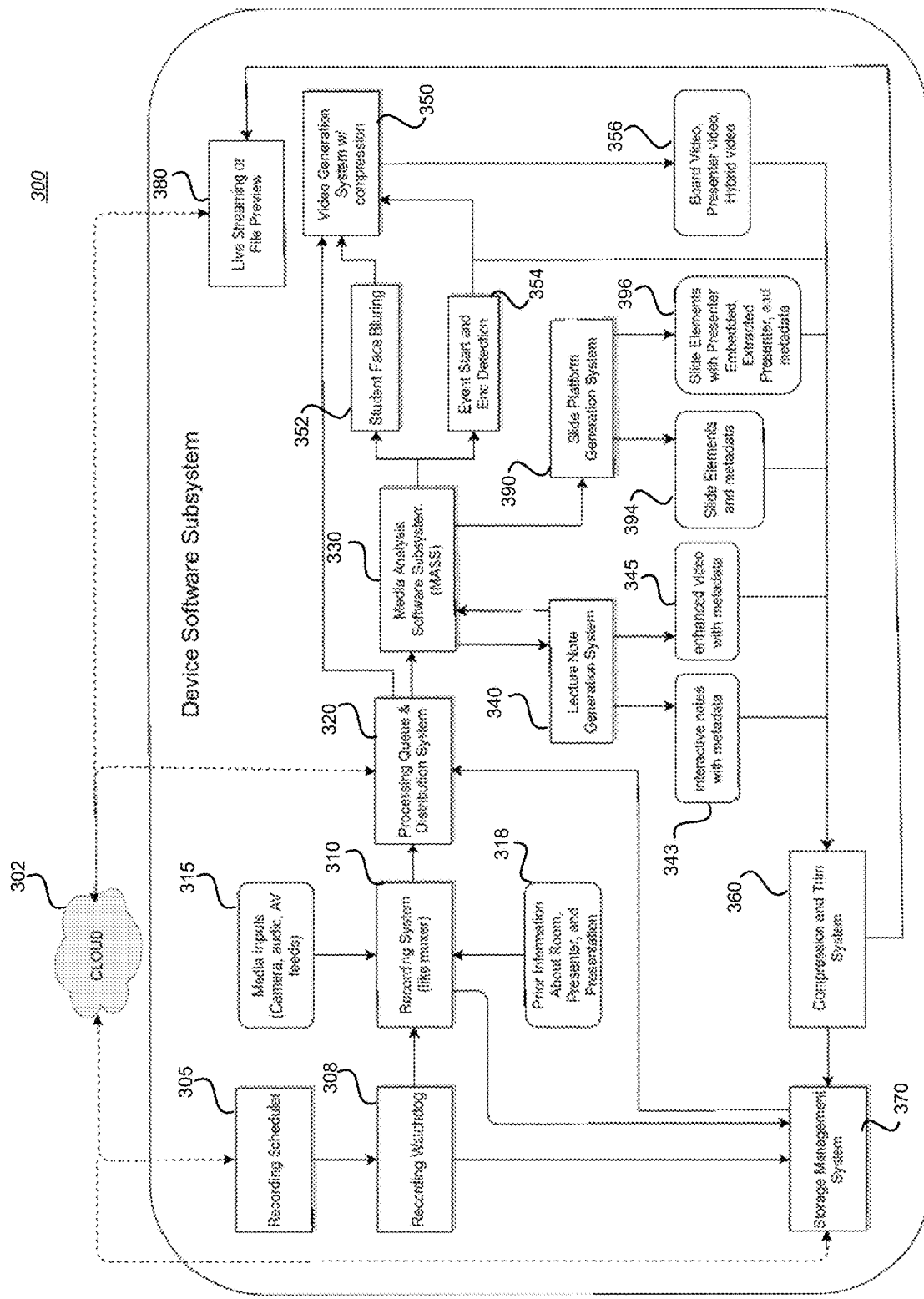
FIG. 3 is a block diagram illustrating an exemplary "top-level" arrangement of software functions and/or software modules/subsystems applied to the input data to form the desired notetaking resource product(s).

FIG. 3 is a block diagram 300 illustrating an exemplary "top-level" arrangement of software functions and/or software modules/subsystems applied to the input data (video, audio, etc.) to schedule, manage, process, analyze, convert the input devices and data into the desired form for the notetaking resource product(s).

These top-level functions embody a core set of functions that enable the input data to be converted to the end product(s). Boxes types with sharp corners are algorithms (for example, computational analysis systems); box types with rounded corners are data sources (for example, inputs) and outputs (for example, data products and metadata). In some instances, the "type" may be fluid, having both characteristics, depending on the implementation preference and/or the hardware and software capabilities of the used subsystem. Additionally, aspects of the functions and processing may happen on a cloud server, or with distributed compute devices, and so forth.

Recording Scheduler 305 and Recording Watchdog 308 manage when the recording starts (when the camera is to turn on, when microphones are to start listening, etc.). Recording Scheduler 305 provides the following services:

a. Initiates and maintains recordings based on a preset schedule or user input.

b. The sponsoring institution (or customer) will typically provide a schedule of recording, which can be obtained directly from the customer's systems or through a cloud interaction. For example, the customer can host the schedule on their server and the Recording Scheduler 305 can download that information. Alternatively, the customer can interface with Recording Scheduler 305 via the conversion entity's website. Schedules may be precise (e.g., 2:45 pm on Wednesday), somewhat inexact (e.g., between 2 pm and 3 pm on Wednesday), or auto start on presentation detection or triggering (e.g., anytime this week or this month).

Interactions with the Recording Scheduler 305 are understood as not necessarily schedule-dependent. For example, there may be a physical keyboard & screen on a device, or a button in the room to edit schedules or trigger the start of a recording. Therefore, the recording may be on-demand being initiated by the customer (or lecturer).

The Recording Watchdog 308 functions to respond to a recording request, which may be initiated by the Recording Scheduler 305, to start the recording and then ensure that the recording goes smoothly (e.g., does not freeze or resumes on device restart). Other functions can be the verification of data from the video/audio sources, proper sound levels, lighting levels, etc. As alluded above, the Recording Watchdog 308 could be activated in response to a button press by the customer (or lecturer, etc.).

For inexact or unknown presentation start times, the Recording Scheduler 305 can utilize various algorithms to detect start/end when loosely defined (e.g., it can start recording early and then trim unnecessary time, a key spoken phrase, a turning on of a recording device, etc.). Examples of such algorithms are further discussed below.

The Recording System 310 coordinates the capture of AV data from the Media inputs 315 and passes it along for computational processing to the media analysis subsystems. It has one or more "watchdogs" to check that AV signals are of high quality (e.g., camera is not blocked or lens scratched, wireless microphones have reliable connectivity, etc.), and can raise alerts on inadequate signal quality (alerts such as internet message, light indicator, warnings on a screen, phone app alert, transmissions to another device, pocket vibrator device, etc.). The Recording System 310 also operates to merge different information sources, for example, Prior Information module 318 can provide introductory or profile information to the Recording System 310 for merging into the final data. As a non-limiting example, one or more of the date, time, lecturer's name, topic of lecture, class room/course name, etc. could be in the Prior Information module 318.

The Processing Queue & Distribution System 320 operates to:
a. Coordinate the processing of recorded AV data. Processing may be coordinated in numerous ways: Live, post recording, and/or in a distributed fashion.
  i. Live—data is processed during the recording.
  ii. Post Recording—data is processed after the recording.
  iii. Distributed—content may be processed all at once, or in parts, some queued for later.
    1. Some media analysis subsystems may not run simultaneously. Some may run after others (queued), or processing may be interleaved.
    2. Delayed content management can be via a queue or it can be via another organization data structures, e.g., a stack, etc.
  iv. Data processing may be accomplished via multiple compute servers or can be processed by the originating compute server.
  v. Distribution of processing ban be based on an analysis of the schedule and estimating compute requirements.

Media analysis software subsystems (MASS) 330 assists and controls the processing of video, audio, and prior data to produce interactive content elements for the conversion entity's service platform (website or app) via invocation and control of connected systems (often referred in by the MASS 330 as a subsystem). Some of the systems may be indirectly controlled and the processed data is, in some instances, fed back to the MASS 330 for further processing by another subsystem. Some of the embedded subsystems can be for speech-to-text transcription, or human motion tracking data, etc. Only the "major" outputs are described in this Fig., additional outputs and subsystems being discussed in the below Figs. Some of the output elements can be compressed, stored on local disk, uploaded to cloud distribution server; they can also be streamed live to users' devices if the content is processed live.

Lecture Notes Generation System 340 performs initial writing enhancement & detection and may include interfacing with module Interactive Notes with Meta Data 343, and module Enhanced Video with Meta Data 345, having self-explanatory functional titles, additional details of which are further described below.

Slide Platform Generation System 390 performs slide enhancements with metadata, including presenter manipulation, if desired. Slide Platform Generation System 390 interfaces with data from MASS 330 and any images (pre-MASS) desired. Outputs of Slide Platform Generation System 390 are the data products Slide Elements and metadata 394 and Slide Elements with Presenter Embedded, Extracted Presenter, and metadata 396. This generation system 390 and associated data products 394, 396 are explained in detail in the description of FIGS. 5A-B.

Student Face Blurring 352 operates to accommodate privacy of audience members, the conversion entity can blur the faces of people who are not presenters (e.g., students/audience), or faces of persons in the "projected" video, if needed. Video data is obtained from camera video stream via MASS 330. It should be understood that the term "student" in the context of this discussion is a general term and could reference any person other than the presenter.

Event Start/End Detection 354 (this includes detecting breaks i.e., pauses in the presentation) provides:
a. Can be used to deal with an event whose start and end have not been precisely defined in advance (e.g., "sometime Wednesday afternoon"), or which may be somewhat loose just due to circumstances (e.g., presenter decides to start a few minutes early, or presenter shows up a few minutes late), or as a way of continuously & automatically detecting presentations (is always checking for room usage).
b. Can use data from MASS 330 (people and room analysis) and lecture notes generation system 340 (e.g., detection of initiation of writing from writing change detection). For example, detect when someone stands up, walks to the front of the room, and begins writing. MASS 330 can directly or indirectly control the video devices (e.g., video pans and/or zooms to follow the presenter using coordinates of the person(s) who is/are the presenter—to generate the video). The act of "standing up and walking to front of room" would come from a "human and room analysis system." Initiation of writing would have come from a "writing surface analysis system." As another example, the system can wait until someone walks up to the lectern, and then use speech-to-text from the lecturer to check for key words or phrases from the microphone such as "Let's Get Started, Everyone" or "OK, Today We'll Be Talking About." End detection can be other phrases hinting at presentation end like "That's all for today" or "See you guys tomorrow."
c. Other signals that can be used to aid detection of presentation start/end (and breaks) can come from:
  i. Camera (analysis of room, presenter, and presentation style):
    1. Detect people and their interactions: if there are one or two people at the front of the room, consistently facing an audience, then it looks like a presentation to the system.

2. Check writing surfaces (when writing is being written, it might be a presentation; when projection image is projected/displayed).
ii. Display devices' usage as an indicator (e.g., television screen, projection screen, etc.)
   1. Microphone (analysis of voices in room):
   2. If there are no voices, probably nothing is happening.
   3. If there are multiple voices speaking back-and-forth or simultaneously, it might just be one or more casual conversations. If on the other hand there are significant periods of time (e.g., 5+ minutes) of a single dominant voice, it may be more like a didactic speech/lecture.
   4. Analysis of intonation of voice (are they speaking loudly, or projecting their voice, or does it sound like a soft conversation with a person standing next to them).
iii. Prior information about the room, presenter, or presentation can be useful:
   1. Room layout can help the camera sensor detect when a person stands at the presentation area of the room, e.g., near a lectern, or near a known writing surface (like on a wall).
   2. If the exemplary system has an image of the presenter it can use face recognition to detect when that specific person (identified by facial recognition algorithm) walks to the front of the room. This can be streamlined, for example, by the exemplary system accessing a database of staff photos; or e.g., learning the faces of typical presenters in a room (example: "Christine" teaches every Monday, Wednesday, and Friday morning, and the system learns to recognize her face; so one Saturday when she holds a review session before the final exam, she is a "known presenter" in the exemplary system and a recording is started automatically).
   3. If the exemplary system knows the presentation on Wednesday morning (e.g., time unspecified, sometime between 8 am and noon, in a room with a whiteboard) will be an interactive workshop, then it might not necessarily wait until someone writes something on the whiteboard, it could start earlier and raise the significance threshold of other non-board-writing signals (for example, a single dominant voice).
iv. If the start time was inexact (e.g., "sometime between 2 pm and 3 pm"), the exemplary human and room analysis subsystems (media analysis subsystems) can estimate the start time by turning on the camera and microphones at 2 pm, calculating the more precise start time between 2 pm and 3 pm, and then can discard data from before the presentation started.
v. If a time window is not specified (any presentation could start at any time, any day), sensors such as camera and audio can record at a lower-than-usual frequency (to save power) to detect if a presentation is occurring. If a presentation is detected the system starts recording (with sensors at normal recording rates) and processing until it detects that the presentation is over.
vi. Other sensors can be used/integrated to aid presentation start detection. For example, room sensors, such as occupancy motion sensor or a light sensor.

Video Generation System 350 performs several functions:
a. Uses results from Student Face Blurring 352, Event Start/End Detection 354 and MASS 330 obtained information.
b. Compression of the video can also be accomplished, if so desired.
c. Video products can include separate videos for each of these elements of interest (shown in this Fig. as Board Video, Presenter Video, Hybrid Video data output 356):
   i. A video stream for each writing surface, or a merged stream with all.
   ii. A video stream for each presenter, or a merged stream with all.
   iii. A video stream which can be zoomed in to each presenter while tracking/following them. A determination of who actually is the presenter can be via a tracking and presenter classification.
   iv. A video stream for the projected/displayed digital media.
   v. A video stream with enhanced writing produced by the lecture notes system, which focuses on enhancing the legibility of writing and hiding or removing anything non-writing.

Outputs of the various systems/subsystems can be forwarded to Compression and Trim system 360, and then forwarded to Storage Management System 370 for storage of the various data streams developed in the previous systems/subsystems. These two systems can evaluate:
a. Utilization and bandwidth metrics for action.
   i. If less network bandwidth is available, more compression may be required in order for the compute server to effectively pass data to the distribution server. For example, bandwidth between the compute server and distribution server may be throttled during the day if the network is shared with people in the room (e.g., a WIFI connection) and network sharing bandwidth is required with people using the room space. In this case, the major uploading can happen after the lecture, perhaps overnight, or during "lull" periods in the lecture.
   ii. When the storage disk of the compute server gets full, its locally stored content is deleted/off-loaded or further compressed.
   iii. Data can be deleted or action level prioritizing what has been uploaded, size of files, type of file, priority level, and course attributes, etc.
   iv. Data can be sent to other devices on the local network to aid in uploading to cloud storage 302.
   v. Data compression rate can be set based on bandwidth and total data size estimated from the recording schedule.
   vi. Multiple versions of the file can be made at different compression levels to enable video laddering.
   vii. Data reduction can be achieved by modeling the presenter's appearance through sparse skeletal key points (e.g., 18 body points). Sending the skeletal points to a user device reduces bandwidth significantly. The users' device can then run a person generation model tuned to the presenter to generate their image.

Live Streaming 380—As mentioned earlier in Processing Queue & Distribution System 310, algorithms can run live and/or can run after the presentation. Processing that is done live can be distributed/streamed to users (made available to their electronic devices) live (e.g., real time or with some latency or delay). This can include any output product (live streaming enhanced video, live streaming notes document, etc.) or any intermediate data or metadata. Live streamed notes document is described later.

Livestreaming/File Preview 380 through the Video Generation System 350 can be adjusted to produce multiple types of videos:
  a. Compressed videos to enable video laddering (adaptive/switchable bitrate streaming).
    i. E.g., multiple videos compressed at different bitrates, user or user's device selects one (perhaps adaptively on the fly).
  b. Vectorized videos of the writing.
  c. Video of board that's denoised (no chalk dust, or other noise artifacts).
  d. Video without presenter.
  e. Vertical video, with key frames/key groupings.
  f. Key frames/key groupings can be videos themselves.
  g. Video where contents are rendered in 3d, (e.g., an analyzed equation in the video can be rendered into a 3d shape).
  h. Modulation to improve attention or other attribute(s):
    i. E.g., Rendering an animated character in the video.
    ii. E.g., Changing presenter's shirt or clothing color at certain intervals.
    iii. Adjust presenter's body language, posture, facial expressions (e.g., make it so that the presenter is constantly smiling by using, such as, a generative adversarial neural network.)
    iv. Replacing the presenter with another human or human like character using, such as, a generative adversarial neural network conditioned on the presenter's pose.
    v. Rendered things from semantic topics (e.g., an image of George Washington is visible on the screen as the presenter talks about George in a course).
    vi. Enhancements for board writing (rotate board to correct offset, enlarge writing, concatenate multi-board room).

It should be noted that various elements of the input data can be timestamped and extracted after automated analysis include one or more of:
  a. Humans in view; incl. Presenter detection, audience detection, segmentation mask, bounding box, location, skeleton, gestures.
  b. Spoken material; incl. Transcription, remarks of importance, or digressions.
  c. Written material; incl. Characters, words, sentences, paragraphs, sections, symbols, equations, titles, sample problems, figures/diagrams, drawings, chalk dust, partially erased writing.
  d. Digital Media and Visual Aid content; incl. Presentation slides, computer usage, document cameras, tablets, bullet points, figures/diagrams, video clips therein.
  e. Room elements; incl. boards, podiums, projection screens, televisions, demonstration equipment; and any changes of these objects.

It should be appreciated that above system(s) are presented in the context of distributed support systems, some system elements being handled by another entity or distant location, displaced from the local hardware. For example, the video camera is local to the presentation room, while the cloud server could be external to the "local" system. It is fully contemplated that more of or the entirety of the system could be a localized system according to design preference. For example, the compute server and/or the distribution server could be "local" to the presentation room or part of the video generating entity (e.g., college).

As one possible deployment scenario, computer-side elements of the hardware could be resident on a "college" campus' computer center, instead of a remote cloud server. Thus, only minimal presentation room hardware would be needed to supplement, if necessary, the "college's" front end system, and software that embodies the various back-end functions described above could run on the "college's" computer system, if possible. Of course, various degrees of "locality" can be achieved based on the available capabilities of the "college" and cost structure presented by the conversion entity. As another example of this flexibility, A/V rooms such as television studios may be available on such a campus (e.g., college) wherein adequate video camera(s), microphone(s), A/V presentation projector(s), etc. may be resident to the television studio whereas there is no need for the conversion entity to provide this equipment. Of course, this example is applicable to colleges, as well as to other institutions, including companies, governments, etc.

On this train of thought, it is fully understood that the process of "converting" a live video presentation to provide add-on note-taking resources, can equally be applied (with some variations and limitations) to a pre-recorded presentation. For example, the recording hardware may not be provided by the conversion entity and the exemplary system may be implemented solely as software running on a compute server, to provide the desired notetaking resource(s) products. Also, physical zooming, panning, etc. of a video camera can be digitally simulated and the processing of a recorded video (with audio) can be achieved to arrive at an equivalent end product. Additional processing may be required, but such techniques are known to practitioners of the art.

Figure 4:
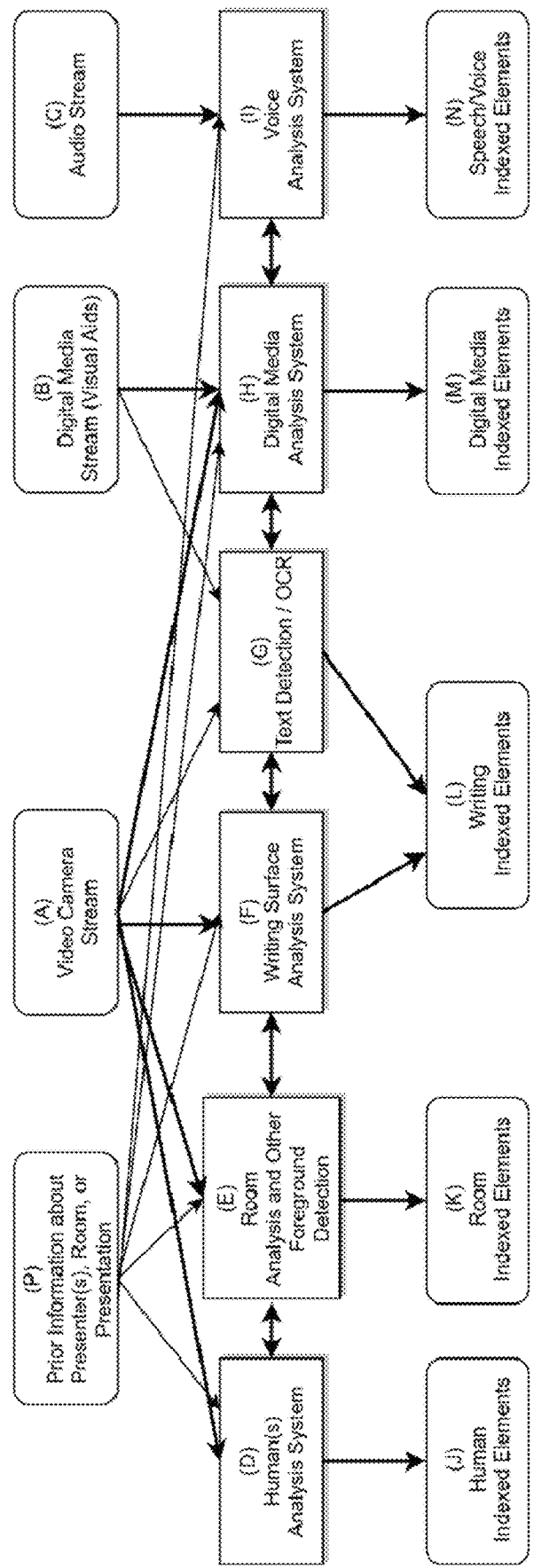
FIG. 4 is a context diagram showing various software subsystems of an exemplary Media Analysis Software Subsystems (MASS).

FIG. 4 is a context diagram 400 showing various software subsystems of an exemplary Media Analysis Software Subsystems (MASS) 340 described in FIG. 3. The various software subsystems are referenced using letters: A-M. In a tested environment:
  a. Data sources (A, B, C) can be passed from video+audio muxer to a compute server (see FIGS. 1-2).
  b. The "compute server" runs the analysis subsystems (D, E, F, G, H, I) and other computational analysis (lecture notes generation system, student face blurring, event start/end detection, video generation system, etc.—see FIG. 3).
  c. Elements (I, J, K, L, M, N) are some outputs of the compute server, which are passed from the compute server to the distribution server. They can be further compressed and/or streamed live (see FIG. 3, for example). All of the outputs are timestamped and synchronized using a reference time. This enables synchronous indexing between different elements of the outputs to enable cross-referencing resources from the different outputs.
  d. The subsystems (D, E, F, G, H, I) can share analysis information with each other to improve overall system analysis.

As a general overview, information from raw digital media (A, B, C) with desired input from Prior Information (P) can be transformed into searchable elements metadata (I, J, K, L, M, N) through interactions with the second layer of subsystems (D, E, F, G, H, I), as:

(D/E): Human(s)/Room Analysis Systems provide one of more of:
  a. Together they analyze what's physically happening in the room (e.g., people and objects).
  b. Detect significant room elements like lecterns, projection screens, television displays, a podium or stage, etc.

c. Tracks people in the room who may be presenters; analyzes their movement and gestures; generates elements including segmentation masks, bounding boxes, skeleton poses.
d. Classifies who is presenter (versus who is audience or participant).
e. Whoever is standing in the presentation area (e.g., front of room; on stage; at lectern), typically alone or with one or two people, for a significant duration of time (e.g., more than a few minutes).
f. Posture analysis (e.g., standing vs sitting; e.g., facing the audience).
g. Audio/voice analysis with respect to physical microphone locations (e.g., if multiple microphones in room, who is near the e.g., lectern-mounted mic; or if speaker is wearing lapel mic); can use synchronicity detection of lip movements with presenter's voice (coming from, e.g., lapel microphone or lectern-mounted microphone).
h. Can be aided by writing detection: whoever is standing near writing that is appearing on the writing surface.

(G): Text Detection and OCR modules, given one or more images which may possibly contain writing, these submodules can detect writing and can read/extract the writing.

(F): Writing Surface Analysis System provides one of more of:
a. Detects writing surface; coordinates with other subsystems to compute metadata for the first part of the Lecture Notes Generation System (detailed below).
b. Foreground distractors (people and projection screens) can be ignored; people will have been detected by person detector/tracker system (D), and (E) can analyze the video to check for a projection screen that blocks the writing surface.

It is noted that (E), (F), and the lecture notes generation system can work together to detect and track slideable/moveable writing surfaces (or to compensate for moving/panning cameras). For an algorithm for tracking could perform one or more of:
a. identifies and follows board corners and edges (which are key points to track).
b. reidentifies moved writing (using template matching/edge matching algorithms).
c. Writing change detection (from lecture notes system) can help indicate that something has been either erased, changed, or moved (i.e., that such an event needs investigation as to whether a board has moved or not).
  i. This can save computation time.
  ii. This can confirm a movement hypotheses.
d. Visual trackers that follow the corners of a sliding board can tell the writing change detection (see lecture notes generation system) where writing has moved, so that it can track writing changes in the new area (continuity for writing change detection).
e. Pan/tilt/zoom cameras (cameras that are reorientable during the presentation, by e.g., a motor or by a human operator): the exemplary writing change detection system will need compensation for this motion (so writing can be tracked in a static position and watched for changes). This is like a flipped version of the "track moving boards" problem, because it may not be that the board is moving, but the camera may be moving. The same principles apply: the board appears to be moving (with respect to the video pixels) and tracking of its edges or corners or path and reidentify writing features. This can be done per sampled frame that is fed to the notes pipeline. This can also be solved by e.g., "video stabilization algorithms".

(H): Digital Media Analysis System provides one of more of:
a. Analyze media stream from device connected to the display/projection system.
b. Examples of produced elements.
  i. Detect transitions in presentation slideshow
  ii. Detect displaying of video or movie
  iii. Detect usage of a document camera (in which a camera points at a piece of paper and the presenter writes on it with their hand) or digital writing surface.
    1. Such writing can be passed as an input, which would be configured to handle the unique circumstances (moveable piece of paper, resizeable digital text, etc.), in order to make use of its handwriting analysis and handwriting elements generation.
c. The digital media analysis system in MASS can classify the segments of a video feed as a presentation or other specific types of computer usage. Specific computer usage is classified using template matching for known program icons, web browser icons, toolbars, taskbars, a combination of OCR and text detection, AV input type, mouse movements, and/or the dynamicness of the video feed.
d. Text can be extracted from displayed videos, and a semantic understanding can be gleaned from projected audio and video streams using machine learning algorithms (e.g., convolutional neural networks) that associate detected features to semantic feature vectors (which represent concepts that can be described by text; as an example, GloVe word vectors).
  i. These can be useful to condition the writing understanding algorithms of document formation for lecture notes generation.
  ii. These can be useful to condition the speech-to-text algorithm (e.g., tune the prior frequencies of expected vocabulary).
  iii. These can be useful to influence the NLP/topic modeling algorithms that summarize the presentation's content and link key concepts to other semantically related content.

(I): Voice Analysis System provides one of more of:
a. Detect presence of human voice (versus e.g., machinery noise).
b. Generates speech-to-text transcription where each word is timestamped.
c. Different speakers can be identified in a speech signal by classifying and distinguishing differences in voice; this can be correlated with or refined by:
  i. proximity of people to microphones using (D+E).
  ii. facial pose analysis: (D) can track mouth pose/movements.
d. Detect important key words or phrases (such as "this will be on the final exam!").

The above subsytems produce data on Human Indexed Element (J), Room Indexed Elements (K), Writing Indexed Elements (L), Digital Media Indexed Elements (M), and Speech/Voice Indexed Elements (N), which are sent from the MASS to follow-along processes and systems.

Figure 5A:
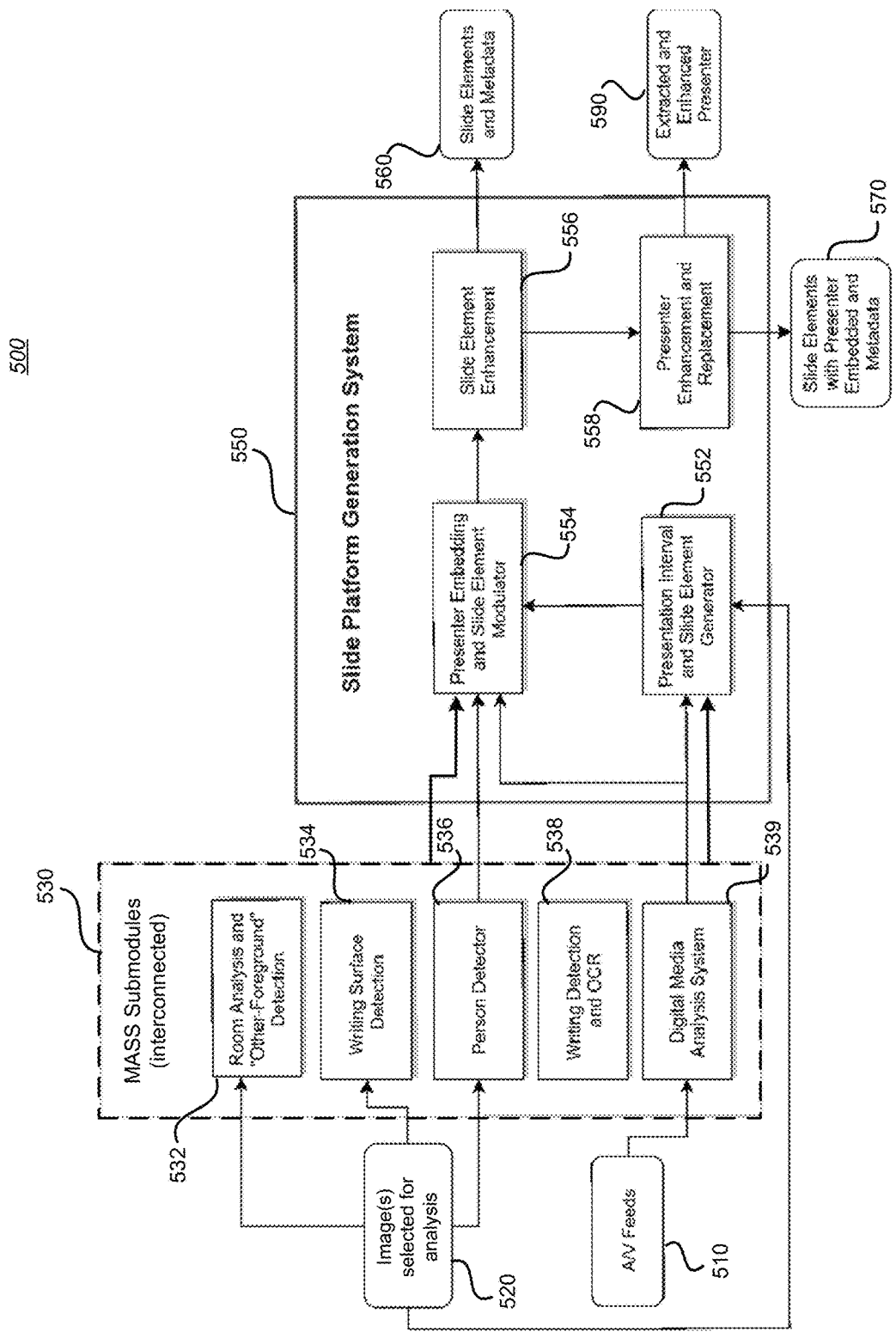
FIG. 5A is an illustration of the MASS-to-Slide Platform Generation System interactions and associated processes for automatically generating slide elements and information for the notetaking resource(s) from a media stream(s).

FIG. 5A is an illustration of the MASS-to-Slide Platform Generation System interactions and associated processes 500 for automatically generating slide elements and information for the notetaking resource(s) from a media stream (s). It is noted, that as a matter of convention, the operations or functions labeled here as "module" processes are shown with two different types of boxes: ones with sharp corners are understood to embody algorithms, while ones with rounded corners are understood to embody data elements/data sources/data products. As stated earlier, in some instances these "types" may be different, depending on implementation preference. These processes are executed within the framework of the exemplary system.

AV feed 510 supplies Digital Media Analysis System 539 in MASS 530, which operates to classify segments of a video feed as a presentation or other specific types of computer usage. The video feed 510 is understood to come from a media source, such as a slide projector, computer running a slide projector-like program, an overhead projector, a computer display output signal, and so forth. Typically, the AV feed 510 will come from a teaching aid device. The MASS 530 classifies the segments of a video feed as a presentation or other specific types of computer usage. For example, specific computer usage is classified using template matching for known program icons, web browser icons, toolbars, taskbars, a combination of OCR and text detection, AV input type, mouse movements, and/or dynamic behavior of the video feed. Output of the Digital Media Analysis System 539 is fed to subsystems Presenter Embedding and Slide Element Modulator 554 and Presentation Interval and Slide Element Generator 552 of the Slide Generation System 550.

Operations by Image Selected for Analysis Module 520:
a. From a video camera with video (or images) of the room (i.e., a digital imaging device that periodically produces digital images and sends/saves them in sequence) the exemplary system can process every frame; or, for computational efficiency, can subsample the frames (e.g., select "one-every-N-frames" from the video, or "one-every-T-seconds", or as soon as analysis is finished on the previous frame). If skipped, the other frames don't have to be entirely ignored; they can be used by other algorithms that benefit from higher temporal resolution and which may be computationally cheaper (for example, person tracking is initialized/refreshed by skeletal pose or bounding boxes from a fully analyzed image, then exemplary system can track cheap low-level visual features until the next analyzed frame).
b. Different algorithms (or process modules) may run at different refresh rates (different "one-every-N-frames" subsampling rates); for example, Person Detector module 534 may run at a different refresh rate than Presenter Embedding and Slide Element Modulator module 552. Data can be interpolated or extrapolated in order to communicate between different subcomponents at different refresh rates (or just use the last available output of a subcomponent).

Operations by Room Analysis and Other-Foreground" (not Necessarily Person) Detection Module 532:
a. Provides generic foreground/background classification.
b. People are not the only distractors. The exemplary system detects writing surfaces, writing, and people. Other distractors include things that come in between the camera and writing surface for either short time durations (e.g., something held by a presenter, such as a yardstick used for pointing) or long time durations (e.g., a demonstration scientific apparatus placed on a table in front of the writing surface). Things that are of short blocking duration (block the writing surface for short duration, like a few seconds) can be filtered out by a temporal weighted filter. Things of long blocking duration can be detected because they are different in appearance from the writing surface being tracked (and they do not look like writing).
c. Algorithms can include "foreground detection/background subtraction" algorithms (term commonly used in literature) such as mixture of gaussians (building a model of color/texture of local patches over time to detect long-term "background" patterns, then using that model for anomaly detection where anomalies i.e., non-background are writing), robust principal component analysis, etc.
d. If 3D depth information is available from camera sensor (e.g., two cameras are used to form a stereo imaging pair, or a stereo capable camera), the exemplary system can classify any object that is at a different distance from the writing surface as non-writing. A 2D plane can be fit into a 3D space to the writing surface, and anything imaged that is off of that plane is considered as non-writing.

Operations by Writing Surface Detection module 534 contains an algorithm that detects writing surfaces and marks pixel regions where it expects writing can appear. This can be accomplished in several ways:
a. Detect rectangular regions with interior surfaces that are smooth and/or contain writing: smoothness is easy to detect; for writing the exemplary system has dedicated detection algorithms.
b. Multi use observation of surface writing to improve automated writing surface detection.
c. A human technician can click the corners or edges of a writing surface, and the interior region is filled by a region growing algorithm seeded in the middle and growing to include smooth surfaces and writing (halting on the boundaries of the region contained by the edges/corners).
d. Or the human can click in another area to create one or more seed points in the interior and the region growing grows from the click locations until it hits the edges of the board.
e. Can be defined as a pixelwise segmentation mask, or as polygonal outlines.
f. Identifies whether the surface is chalkboard, whiteboard, glassboard, smartboard, paper surface, or other writable material.

Operations from Person Detector (Extract and/or Mask) Module 536:
a. People are the most common distractors in front of writing surfaces, so the exemplary system is able implement a dedicated detector to detect them (so as distractors they can be ignored by algorithms focusing on writing).
b. The algorithm is aware and also learns what a human is and generates a pixelwise mask (each pixel is assigned a probability of "person" vs "non-person"), polygonal outline, and/or pose skeleton.
c. Can be aided by 3d depth if e.g., stereo camera is used.

Operations by Writing Detection and OCR Module 538:
a. Writing detection—algorithms may include:
  i. Edge, ridge, line, or stroke detection.
  ii. Using pattern of strokes as detection feature: writing generally consists of a bunch of clustered thin lines, which different clustering patterns for different languages/styles.
  iii. By tracking the hand of the presenter and correlating hand motions/gestures with markings appearing on the surface.

iv. With a neural network trained to detect writing ("text detection", but also for diagrams, figures, drawings, mathematics, etc.).
v. Part of an optical character recognition (OCR) algorithm.
vi. Any combination of above algorithms or approaches.
vii. Different algorithms can be used for writing detection. As an example, a Ridge detection algorithm/"filter" can be used to:
  1. Compute dx and dy gradients: dx is horizontal first-difference which is obtained by convolving a Sobel or Scharr filter with the image, e.g., with filter kernel 3×3 coefficients [[−1, 0, 1], [−2, 0, 2], [−1, 0, 1]] for dx and dy is transposed as [[−1, −2, −1], [0, 0, 0], [1, 2, 1]].
  2. Compute dxx, dxy, dyy second derivatives by again convolving Sobel filters: dxx=horizontal Sobel filter repeated on dx, dxy=vertical Sobel applied to dx, dyy=vertical Sobel filter repeated on dy.
  3. Compute and save dxx^2, dxy^2, dyy^2 by squaring each pixel in dxx, thy, dyy respectively (e.g., squaring 3 means 3^2).
  4. Filter output is the largest eigenvalue of the eigenvalue problem for the matrix [[dxx, thy], [dxy, dyy]], i.e., output=0.5*(dxx+dyy+sqrt(dxx^2+4*dx^2−2*dxx*dyy+dyy^2)).

Direct or indirect outputs of the MASS 530 submodules as well as from Image(s) selected for analysis 510 are fed into the Slide Platform Generation System 550, which comprises four subsystems or modules: Presenter Embedding and Slide Element Modulator 554, Slide Element Enhancement 556, Presentation Interval and Slide Element Generator 552, and Presenter Enhancement and Replacement 558.

Starting first with Presentation Interval and Slide Element Generator 552 subsystem or module, it takes output from the Digital Media Analysis System 539 and any other necessary outputs from MASS 530, as well as Image(s) selected for analysis 520. The purpose of this module is to take a presentation (slide based, board and slide based, physical sign based, etc.) and break the presentation into smaller segments embedded with other AV content, web content, or metadata. These smaller segments become slide elements and other media are converted into slide elements. As an example: a slide based presentation is given. Presenter interval generator can be used on a digital presentation or physical visual aids such as cue cards.

Presentation Interval and Slide Element Generator 552 describe functions for Presentation Interval generation and Slide Element generation. Presentation Interval generation utilizes an algorithm to determine "intervals" within the presentation. For example, a presentation is being given using a slide presentation viewer. A sampling of frames in the video can processed or the whole video can be processed. A merge sort based approach can be used, for example, to reduce the number of frames to process.

A similarity score can be created for frames or regions of frames and frames clustered together into an interval based on their similarity score. Intervals can also be created without using a similarity score by algorithms which can directly produce intervals.
  a. A similarity score can be created for the whole frame using algorithm such as Structural Similarity Index, or analogous metric.
  b. A similarity score could also be patch based where the metric for clustering frames into one interval is based on number of similar patches.
  c. A similarity score could be created by comparing the number of similar features such as Binary Robust Invariant Scalable Keypoints (BRISK) algorithm features or Convolutional features from a CNN.
  d. A similarity score could be created by using a siamese neural network trained on presentation content to detect if groups of frames belong in a single interval.
  e. A neural network (e.g., recurrent neural network, e.g., CNN) could be used to create intervals from a sequence of frames. For example, neural networks can be trained to detect and classify the significance of changes and transitions. Some transitions should be ignored (e.g., building up bullet points or using animations on one "slide"; or e.g., segmenting videos by important/conceptual scene change), and some transitions may be more important than others (e.g., detecting a title slide). Machine learning can help evaluate such "importance or significance" of intervals/transitions better than simpler algorithms like structural similarity. Training machine learning algorithms can be done with a dataset of many presentations.

Even without understanding the semantics of the content, an algorithm may clue in to significance cues such as changes in text style (e.g., title slide vs. regular slide) or motion patterns (e.g., detecting animation/video transitions).

Text detection and OCR algorithms could be used to get a word similarity score using similarity measurements such as the Levinstein distance or topic modeling algorithms such as Latent Semantic Analysis, etc.

These and other similar algorithms can be used on any combination of input data not limited to these sources:
  a. Slides or AV feeds
  b. Speech to text data
  c. OCR of handwriting Changes in semantic content can be scored to evaluate similarity/transitions. For example, different chapters can be clustered by their semantic content (these N slides cover topic X, then the next M slides cover topic Y, with a clear semantic boundary between). Such chapterization can be aided by a guide e.g., by a table of contents (which could, for example, be automatically detected by e.g., a neural network classifying what a typical table-of-contents looks like, or, for example, can be provided by the user before or after the presentation, perhaps in the form of a textbook that the presenter follows).

Evaluating the semantic content of presentations can be aided by prior information about topics that may be covered, to help narrow in on what types of topics will appear (to help better categorize) and how fine-grained differences in topics might be (to help better evaluate topic transitions). Such prior information can be gleaned from many sources such as e.g., a course syllabus; a website; an onboarding tutorial or video; a course textbook; a book authored by the presenter that they'll probably talk about or touch upon, etc.

A combination of these algorithms could be used to create intervals from the video, wherein these intervals are considered slide elements which could be further modulated.

Slide Element generation takes content from boards, transcripts, or visual aids, and turn them into slide elements which can be chronologically interspersed with slide elements generated from the presentation interval generation step.
  a. Content from boards, transcripts, or visual aids can be embedded within slide elements from the presentation interval generation step. An example would be an equation simplification written on the board gets added to a slide element with the corresponding equation.
  b. Visual aids or content to turn into slide elements or embed into existing slide elements can also be queried from databases or from web searchers. An example would be if a presenter is talking about a public domain landmark such as the Eiffel Tower. With topic modeling the exemplary system could query a database for an image of the landmark and create a new slide element or embed it into an existing slide element.

Presenter Embedding and Slide Element Modulator 554 takes output from the Person Detector 534, as needed from MASS 530, and Presentation Interval and Slide Element Generator 552.

Presenter Embedding is optional and is when the presenter is added inside a slide element. In the most common case, the presenter is intelligently placed inside their own slides. The Slide Element Modulator modulates a slide element to make space for the presenter in the slide element and together these two modules work to have a visually consistent placement for the presenter across all of the slide elements that they are embedded in. Presenter Embedding and Slide Element Modulator functions are optional and specific portions of the presenter (head, torso and above, etc.) could be embedded instead of the presenter's full body. The Presenter Embedding and Slide Element Modulator functions provide one or more of:
  a. Presenter detection
  b. Pointing gesture detection: The exemplary system determines if the presenter is pointing at writing, slide content, or any visual aids. Gesture detection can be done using pose estimation network, seeing if hands or pointer objects are pointed towards text, writing, or visual aids in the scenery (scenery content). The exemplary system can cross corroborates scenery content with transcript data to see if scenery content that is being pointed to semantically matches what the presenter is saying in the transcript to verify a pointing gesture.
  c. Slide element content estimation: Through text detection in MASS 530 and document semantic structure extraction, the exemplary system is able to classify elements with a slide element that we call slide parts. The exemplary system can semantically combine slide parts and add a spring force between them similar to Pictorial Structure Models with the weighting being on semantic relevance. Slide parts get associated metadata with one form being timestamps to when they were displayed.
  d. Presenter Reorientation and slide element modulation: Through human segmentation in the MASS system, the exemplary system have a pixel precise segmentation mask. A simple geometric transformation(s) can be performed (image flip, scaling, rotations, translations) on the extracted presenter to reorient them to preserve pointing gestures on the correct content.
  e. Presenter Embedding; The simplest embedding is to extend the slide element's width to make empty space for presenter embedding. Through slide element content estimation, the exemplary system identifies empty space in the slide elements. Empty space is found across all slide elements (space and time) to make global placement proposals for presenter embedding. The slide elements can be individually separated or modulated with some weighting from the global modulation to make space for the presenter. The presenter undergoes individual (per slide element) geometric transformation with some influence on the transformation from neighboring slide element embeddings to make presenter reorientations more consistent.
  f. Alternatives to presenter embedding are to render the presenter in the web page instead of within a slide element, having the original video or a cropped version of the original video and tracking the presenter to keep them in view, or to have no presenter displayed on the web platform.

Slide Element Enhancement 556 takes output from Present Embedding and Slide Element Modulator 554 and outputs the data product Slide Elements and Metadata 560. It operates to enhance slides in various ways:
  a. Emphasis can be made on certain slide parts. Emphasis detection can be done by the previous pointing gesture detection step, identifying or simulating laser pointer or pointing device detection (illuminance hotspots), and/or by having a high word and topic utterance frequency count. An example of increasing emphasis would be rendering an animated hand pointing to an equation if a presenter pointed to it. Other ways to emphasize include making content bold, recolorizing, resizing, underlining, or applying other text editing modulations, etc.
  b. Improved readability: font size can be estimated and enlarged to aid those with visual impairments.
  c. Improve attention: Slide parts which are the topics of discussion can be dynamically made visible as the presenter talks. Transitions can be created for slide parts similar to those made available in slide editing software such as dissolving or moving slide parts from off of the slide element to its designated place within the slide element. Slide elements could have rendered animated spirits within them with an example being a turtle which moves under slide parts which are being discussed. Slide parts could change color or have minor movements as they are being discussed or if the slide element is static for too long.
  d. Quiz questions: Quiz questions can be generated directly from the transcript, written content, slide elements, or presenter provided data. A basic form of a quiz question is a fill in the blank created by hiding part of a sentence with a text box for user entry within a slide element. This could be dynamically generated at a certain frequency or at the end of topics detected by topic modeling. Questions can be in the form of a popup after a slide element or themselves be a slide element.
  e. Web modules: Slide elements can embed web elements such as calculators, media, text editors, interactive demonstrations, and other learning aids.
  f. Links to other slide elements and lectures: topics within slide elements can be hyperlinked to link to other courses, lectures, and slide elements which cover the topic. An example would a slide element with a slide part which is a heading that states now integrate by parts. Clicking or interacting with integrate by parts could take the user to another course at the slide lecture were integration by parts was first discussed.
  g. Links to other websites: Similar as the previous bullet point except the links are to external websites such as Wikipedia, etc. for topics within a slide element.
  h. Rendered slide parts into 3d, (e.g., an analyzed equation can be rendered into a 3d shape). The exemplary system can render things from semantic topics (e.g., George Washington walks across screen as the presenter talks about George in a history course).

Presenter Enhancement and Replacement 558 takes output from Slide Element Enhancement 556, and outputs the data products Slide Elements with Presenter Embedded and Metadata 570 and Extracted and Enhanced Presenter 590. Presenter Enhancement and Replacement 558 performs one or more of the following:

a. It is optional to embed the presenter into slide elements and it is optional to enhance or replace them.
  b. The exemplary system may replace the presenter with a rendering of the presenter's skeletal pose or outline (animated over time as detected) in order to retain their gestures and body language.
    i. Or just their arm or hand, or an indicator for their arm or hand (e.g., a rendered cartoon pencil or mouse cursor).
  c. The exemplary system may replace the presenter with another rendered human or human like animated character by using a generative adversarial neural network conditioned on the presenter's pose.
  d. The exemplary system may change dynamically change the perspective of the presenter by showing their full body, just their head, or their upper body. The perspective can change based on duration of a slide element or on semantic transitions such as topic or punctuations.
    i. The exemplary system can use generative adversarial networks to create fictitious perspectives of the presenter such as showing a video of them at a 20 degree when they are looking straight at the camera.
  e. The exemplary system can modulate/alter the presenter:
    i. e.g., rendering an animated character in the video.
    ii. e.g., changing presenter's shirt or clothing color at certain intervals.
    iii. Adjust presenter's body language, posture, facial expressions (e.g., make it so that the presenter is constantly smiling by using a generative adversarial neural network).

The exemplary system generates slide elements, presenter embedded slide elements (570), an extracted and enhanced version of the presenter (590) and generates corresponding metadata (560) for the previously mentioned items. Specifically, the output data/metadata becomes Slide Elements and metadata 394 and Slide Elements with Presenter Embedded, Extracted Presenter, and metadata 396 found in FIG. 3. This content is used on the exemplary system learning platform, videos, and other viewing modalities.

The design of the exemplary slide platform enables novel information access efficiencies with one including being able to scroll through the slide elements in a similar fashion to a pdf or other document viewer. The slide elements and slide parts can be interactive with one incarnation being the slide elements being videos. In this configuration slide elements could be scrolled through and a video could be played as they were clicked on. There could be further narrowing of time by interacting with a slide part. The resulting slide information is integrated with the notetaking generation system to form a unified notetaking resource.

Figure 5B:
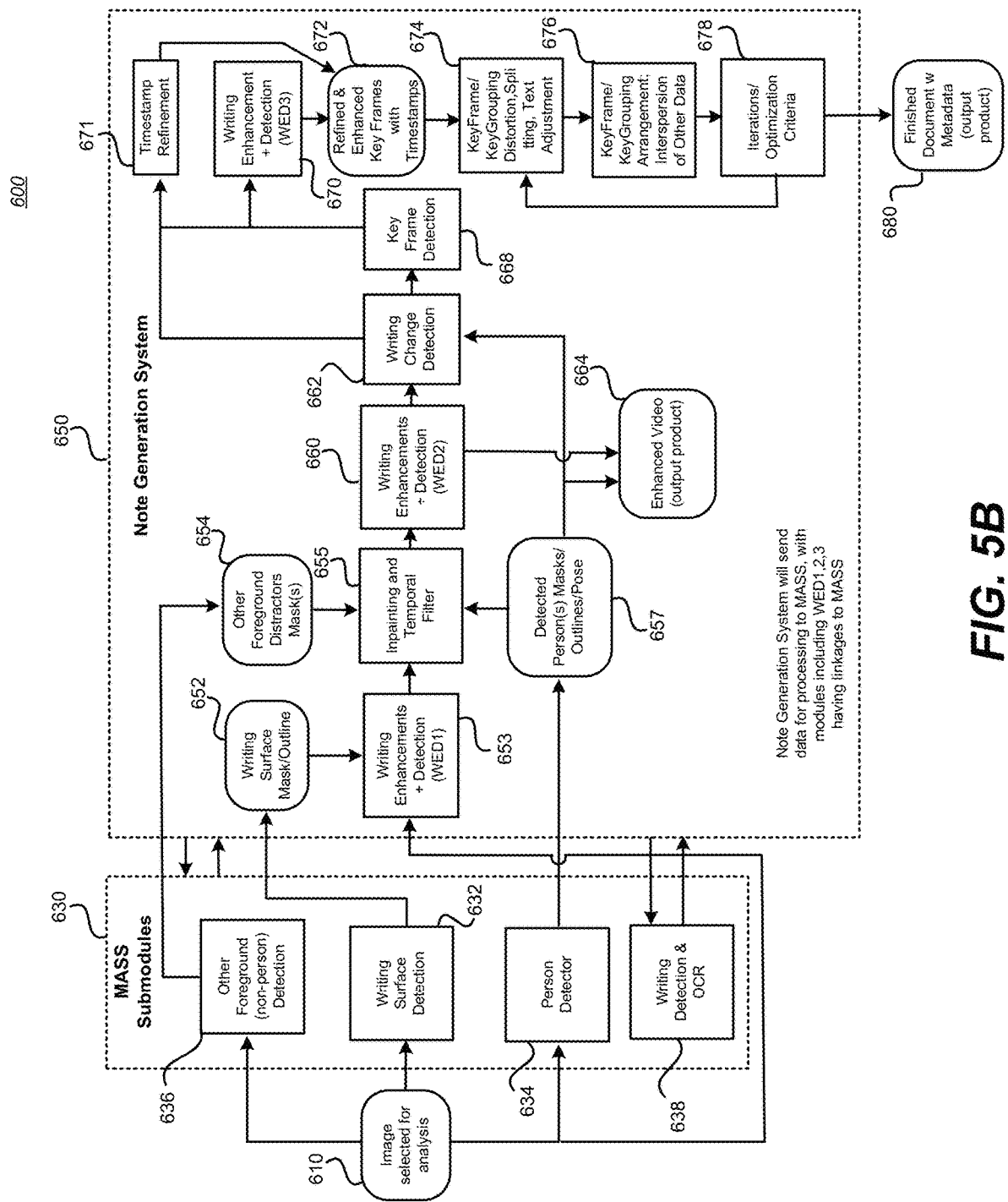
FIG. 5B is an illustration of the MASS-to-Note Generation System interactions and associated processes for automatically generating note elements and information for the notetaking resource(s) from a media stream(s).

FIG. 5B is an illustration of the MASS-to-Note Generation System interactions and associated processes 600 for automatically generating note elements and information for the notetaking resource(s) from a media stream(s). It is noted, that as a matter of convention, the operations or functions labeled here as "module" processes are shown with two different types of boxes: ones with sharp corners are understood to embody algorithms, while ones with rounded corners are understood to embody data elements/data sources/data products. As stated earlier, in some instances these "types" may be different, depending on implementation preference. These processes are executed within the framework of the exemplary system.

Operations by Image Selected for Analysis Module 610:
  a. From a video camera with video (or images) of the room (i.e., a digital imaging device that periodically produces digital images and sends/saves them in sequence) the exemplary system can process every frame; or, for computational efficiency, can subsample the frames (e.g., select "one-every-N-frames" from the video, or "one-every-T-seconds", or as soon as analysis is finished on the previous frame). If skipped, the other frames don't have to be entirely ignored; they can be used by other algorithms that benefit from higher temporal resolution and which may be computationally cheaper (for example, person tracking is initialized/refreshed by skeletal pose or bounding boxes from a fully analyzed image, then exemplary system can track cheap low-level visual features until the next analyzed frame).
  b. Different algorithms (or process modules) may run at different refresh rates (different "one-every-N-frames" subsampling rates); for example, Person Detector module 634 may run at a different refresh rate than Writing Enhancement+Detection (WED1) module 653. Data can be interpolated or extrapolated in order to communicate between different subcomponents at different refresh rates (or just use the last available output of a subcomponent).

Operations by Writing Surface Detection module 632 contains an algorithm that detects writing surfaces and marks pixel regions where it expects writing can appear. This can be accomplished in several ways:
  a. Detect rectangular regions with interior surfaces that are smooth and/or contain writing: smoothness is easy to detect; for writing the exemplary system has dedicated detection algorithms (see also "Writing Enhancements+Detection (WED1)(WED2)(WED3) modules 653, 660, 670).
  b. Multi use observation of surface writing to improve automated writing surface detection.
  c. A human technician can click the corners or edges of a writing surface, and the interior region is filled by a region growing algorithm seeded in the middle and growing to include smooth surfaces and writing (halting on the boundaries of the region contained by the edges/corners).
  d. Or the human can click in another area to create one or more seed points in the interior and the region growing grows from the click locations until it hits the edges of the board.
  e. Can be defined as a pixelwise segmentation mask, or as polygonal outlines.
  f. Identifies whether the surface is chalkboard, whiteboard, glassboard, smartboard, paper surface, or other writable material.

Operations from Person Detector (Extract and/or Mask) Module 634:
  a. People are the most common distractors in front of writing surfaces, so the exemplary system is able implement a dedicated detector to detect them (so as distractors they can be ignored by algorithms focusing on writing).
  b. The algorithm is aware and also learns what a human is and generates a pixelwise mask (each pixel is assigned a probability of "person" vs "non-person"), polygonal outline, and/or pose skeleton.
   c. Can be aided by 3d depth if e.g., stereo camera is used.

Operations by Writing Detection & OCR module 638 are similar to those described in FIG. 5A's module 538 and are not restated here.

Operations by Other-Foreground" (not Necessarily Person) Detection Module 636:
   a. Provides generic foreground/background classification.
   b. People are not the only distractors. The exemplary system detects writing surfaces, writing, and people. Other distractors include things that come in between the camera and writing surface for either short time durations (e.g., something held by a presenter, such as a yardstick used for pointing) or long time durations (e.g., a demonstration scientific apparatus placed on a table in front of the writing surface). Things that are of short blocking duration (block the writing surface for short duration, like a few seconds) can be filtered out by a temporal weighted filter. Things of long blocking duration can be detected because they are different in appearance from the writing surface being tracked (and they do not look like writing).
   c. Algorithms can include "foreground detection/background subtraction" algorithms (term commonly used in literature) such as mixture of gaussians (building a model of color/texture of local patches over time to detect long-term "background" patterns, then using that model for anomaly detection where anomalies i.e., non-background are writing), robust principal component analysis, etc.
   d. If 3D depth information is available from camera sensor (e.g., two cameras are used to form a stereo imaging pair, or a stereo capable camera), the exemplary system can classify any object that is at a different distance from the writing surface as non-writing. A 2D plane can be fit into a 3D space to the writing surface, and anything imaged that is off of that plane is considered as non-writing.

Operations by Writing Enhancements+Detection (WED1), (WED2), (WED3) can take place across modules 653, 660, 670. Writing detection is processed using one or more MASS 630 submodules on images of intermediate steps in note generation.
   a. It can be beneficial to use some algorithms in different parts (WED1), (WED2), or (WED3) corresponding to 653, 660, 670, respectively, depending factors such as:
      i. computation time—slower algorithms might be relegated to part (WED3) 670 since they run at low frequency (only on specially selected key frames).
      ii. Performance in the presence of distractors—some algorithms' performance may be hampered or degraded by not-yet-removed distractors in part (WED1) 653.
   b. Writing detection algorithms may include:
      i. Edge, ridge, line, or stroke detection.
      ii. Using pattern of strokes as detection feature: writing generally consists of a bunch of clustered thin lines, which different clustering patterns for different languages/styles.
      iii. By tracking the hand of the presenter and correlating hand motions/gestures with markings appearing on the surface.
      iv. With a neural network trained to detect writing ("text detection", but also for diagrams, figures, drawings, mathematics, etc.).
      v. Part of an optical character recognition (OCR) algorithm.
      vi. Any combination of above algorithms or approaches.
      vii. Different algorithms can be used for writing detection. As an example, a Ridge detection algorithm/ "filter" can be used to:
         1. Compute dx and dy gradients: dx is horizontal first-difference which is obtained by convolving a Sobel or Scharr filter with the image, e.g., with filter kernel 3×3 coefficients [[−1, 0, 1], [−2, 0, 2], [−1, 0, 1]] for dx and dy is transposed as [[−1, −2, −1], [0, 0, 0], [1, 2, 1]].
         2. Compute dxx, dxy, dyy second derivatives by again convolving Sobel filters: dxx==horizontal Sobel filter repeated on dx, dxy==vertical Sobel applied to dx, dyy==vertical Sobel filter repeated on dy.
         3. Compute and save dxx^2, dxy^2, dyy^2 by squaring each pixel in dxx, dxy, dyy respectively (e.g., squaring 3 means 3^2).
         4. Filter output is the largest eigenvalue of the eigenvalue problem for the matrix [[dxx, dxy], [dxy, dyy]], i.e., output==0.5*(dxx+dyy+sqrt (dxx^2+4*dxy^2−2*dxx*dyy+dyy^2)).

Operations of Writing Enhancement (cleaning up writing, removing non-writing artifacts) portion of Writing Enhancements (WED2) module 660 may include:
   a. Remove chalk dust—specifically for chalkboard (these approaches can be modified for non-chalk board (e.g., whiteboard, etc.) scenarios:
      i. detecting chalk dust by texture characterization (writing is more likely to be thin strokes of higher contrast/salience).
      ii. Removing low (spatial) frequency data, as writing is higher (spatial) frequency.
      iii. Using neural networks to learn what chalk dust looks like, and learn to cleanly remove it.
      iv. Temporal tracking:
         1. Dust or markings (or writing) on the board before the presentation begins can be erased.
         2. Detect the eraser (the physical object(s)) and tracking it.
         3. Dust is generated during erasures. The exemplary system may already be attempting to detect erase events, so checking for dust additions can be made during and immediately after erase events in the spatial vicinity (can be a large vicinity since the eraser brush can be swept several feet away from prior writing).
         4. Any dust (or partially erased markings) leftover after an erase event can be removed from future images. Partially erased markings to be removed must have had their salience significantly decreased (if not, if the salience is the same, it wasn't intended to be erased).
   b. Remove partially erased writing (on chalkboards, the eraser sometimes merely decreases the saliency of the writing, and older writing is still legible when the presenter starts writing new content over it) by filtering with respect to temporal context. The exemplary system is able to subtract the influence of leftover previous writing that was detected that the presenter had intended to erase (intended to erase means its saliency/ contrast decreased, especially if an associated erase arm gesture was detected). The subtraction algorithm can be adaptive and context-sensitive (weighted by a match score between what is to be subtracted and the current writing state); this is characteristic of most subtraction operations mentioned in this list of enhancement algorithms.
  c. Remove surface degradations (e.g., stains, scratches): these remain on the writing surface between presentations; they are a constant texture fixture that can be subtracted.
  d. Increase contrast by correcting lighting issues (e.g., corners of the board that are dark due to room lighting, bright reflections of ceiling lights, or lights mounted to the top of a chalkboard).
  e. Increase contrast by correcting faint writing instruments (faint chalk, faded markers, low-contrast colors like yellow markers against whiteboards). Colored markers can be enhanced by artificially increasing contrast for colored strokes; and in general low contrast strokes can be distinguished from noise (dust, etc.) by conditioning on presenter writing gestures (hand movement) and on relation to writing events.
  f. Super-resolution, using image processing algorithms such as neural networks.

Operations of Inpainting and Temporal Filter (Distractor Removal) module 655 includes one or more of:
  a. Keeps track of writing behind people and foreground distractors: maintains "last-known-state" of writing surfaces, updated whenever the distractor is moved out of the way.
  b. Inpainting of writing is often required if writing is blocked by foreground objects and people and removes short-time-interval distractors (e.g., any pixels missed by the Person Detector 634 and Foreground detector(s) 636 and 654, such as a person's elbow slightly missed by the mask). Writing is expected to remain on the writing surface for medium durations, so should survive through this filter. Anything written and erased within such a short time interval would have to be very brief, like one word, which can be lost, but can be considered unimportant. Such very-short duration writing is often a mistake (erased quickly and corrected). Recognizing the duration of writing is described in the section on writing change detection.
    i. For example: save the last N sampled video frames. For each pixel: if the human mask blocks most of the N frames, then don't update that pixel (it will thus remain inpainted with whatever was there before the person walked in front); otherwise update it with the average of the non-masked pixels.
  c. Camera noise due to sensor noise can be reduced by a temporal weighted filter, so it is advantageous to put nonlinear enhancement filters that could potentially amplify sensor noise after the temporal filter (i.e., in Writing Enhancements+Detection parts (WED2) 660 and (WED3) 670. The edge detection of Writing Detection Enhancements part (WED1) 653 can be a linear or nearly linear filter such as difference-of-gaussians. Deep multilayer convolutional neural networks are an example of a usually "highly nonlinear" filter that can potentially amplify or be distracted/degraded by sensor noise.
  d. An example algorithm for temporal masking to remove foreground distractors and inpaint with prior text, masked temporal median filter is provided, noting other algorithms may be utilized, if so desired:
    i. Let p1, p2, p3, p4, p5 be the pixel values (each 1 scalar number) for the last 5 grayscale image frames at the same spatial location (at corresponding times e.g., t1=2 seconds, t2=4 seconds, etc.), and m1, m2, m3, m4, m5 be the corresponding person or foreground detector mask probabilities (when m1=1, it is definitely a foreground distractor; when m1=0, it is definitely not foreground i.e., it is writing).
    ii. If m2 and m3 are 1, and m1, m4, m5 are 0, then the resulting filtered pixel value is the median of p1, p4, p5. If any mask values are not binary (not 0 or 1) we can use a weighted median.
    iii. If all m1, m2, m3, m4, m5 are 1, then the resulting returned pixel value is NULL or some indicator that the state is currently unknown, so that the resulting saved filtered pixel value will be whatever the last-known-pixel-value was.
    iv. This can be generalized to let p1, p2, p3, p4, p5 each be a vector (multiple numbers), for example for color images, or if each represents a small patch e.g., 9 values for a 3×3 grayscale patch. Then the median filtering step can be a geometric median which is the multidimensional generalization.

Aspects of Enhanced Video module 664 (from output of Writing Enhancements+Detection (WED2) 660) are one or more of:
  a. It can be served as a very low bitrate video representation of the presentation, for users with slow or low bandwidth internet connections; as a video it is easier to distribute to users (it's useable by any video player). It can also be vectorized (converted to digitized stroke lines) for a potentially even lower bitrate representation, which would likely require custom viewing software.
  b. Some presenters prefer not to be seen in a video; the exemplary system can display this enhanced writing video instead of an original camera video in order to preserve their privacy (since the person has been subtracted/inpainted).
    i. The exemplary system can overlay a rendering of their skeletal pose or outline (animated over time as detected) in order to retain their gestures and body language.
    ii. Or render just their arm or hand, or an indicator for their arm or hand (e.g., a rendered cartoon pencil or mouse cursor)
    iii. The exemplary system can replace the presenter with another rendered human or human like animated character.
    iv. The skeletal pose (or e.g., just arm or hand) position data over time can be streamed/saved independently from the enhanced writing strokes for a flexible, low-bitrate way to reproduce the presenter's gestures later (e.g., the user's viewing device can render the skeleton itself, and the user can easily turn this display feature on and off).
  c. The exemplary system can update the current known writing state, an image, that includes what is currently behind foreground distractors. This updating image forms the "Enhanced Writing Video" outputted product 664.

Operations for Writing Change Detection module 662 provides one or more of:
  a. Writing change detection has uses including, but not limited to, key frame detection; timestamping writing and metadata generation, characters, text boxes, and diagrams; notes document arrangement; and as a way for a user interface to interact with, search through, and playback (reproduce the temporal sequence of) writing.

b. The exemplary system detects writing events. In one embodiment the detection is in Writing Enhancements+ Detection (WED2) 660 stream at some scope per pixel, per group/window of pixels, per stroke, per character, per word, per sentence/equation, or per paragraph; classifying 3 types of writing events (addition, removal, or alteration—see list below). The timestamp of each event is saved. Such events are detected by their local context (within a local context window around a pixel) by two types of algorithms—template matching, or tracking a summed quantity over time. Summed quantities can include total change in edge/ridge brightness, number of bright/dark pixels, number of strokes or total length of strokes (all within the local context window). Alteration events are best detected by appearance matching (like patch matching) using a fast parallelizable localized template matching against the current state (an image maintained to contain known writing, updated upon new events). Template matching is better at detecting alterations than tracking summed quantities over time (like summed brightness of edges or summed length of strokes), since the summed quantities in the local context window may not have greatly changed upon an alteration (if for every stroke erased, a new stroke of similar length is quickly written). However summed quantity tracking is needed to classify which type of alteration, by comparing current writing quantity against previous (if less writing than before, classify as erasure; etc.).

c. Alternatively, writing change detection can be done using characters detected by text detection (and/or OCR): the exemplary system can track the number of characters or the growth or shrinkage of bounding boxes around written text. When the number of characters in a local context window changes, or the area of a bounding box around some text changes, the quantity of text has changed, and the exemplary system can mark writing events (addition of writing, removal of writing) in such cases.

d. The 3 classes of alterations that can be defined and timestamped are:
  i. Addition of writing (new writing against previously blank surface).
  ii. Alteration of writing (for example, a correction of a mistake).
  iii. Removal of writing (erase; restores surface to blankness).

e. The change detection can be influenced by gesture detection of the presenter: when their arms are near the board and move in certain patterns that look like they are writing. This can help limit false positives of the writing change detector (writing can only appear when the presenter is nearby and gesturing with their hand on the board).

f. Change detection can also be influenced by detecting and tracking the erasers (the physical objects, like a brush or towel) at the board: when they are picked up and swept around, writing is probably being changed.

g. Change detection can also be influenced by speech recognition of the presenter. For example, detecting mistakes: if they say something like "oops, I made a mistake", this can be used to help classify the writing event (probably an alteration) or perhaps discard the writing event (so that it won't be used for forming the notes document). The exemplary system can also tag the writing event with other metadata such as "probably a mistake", which is a different tag than the 3 classes defined above.

Operations of the Key Frame Detection module 668 provide one or more of:

a. The key frames are specially generated images which collectively contain all or nearly all of the written information from the video. Key frames are used to gather writing for the notes document. Keyframe is generated by the Key Frame Detection module 668.

b. Writing changes are used to detect and save "key frames". Keyframe detection is a process of clustering writing events in space and time, while: minimizing double-erasures/double-alterations (i.e., skipped writing), maximizing the 2d surface area of saved writing (so key frames aren't saved for trivially small strokes), minimizing duplicate writing (i.e., redundancies across multiple key frames), and minimizing the total number of key frames. The point cloud (of writing events) is assumed slightly noisy due to defects such as camera noise or errors by writing detectors or person detectors. The key frame can be "flattened" from a point cloud of 3d writing events to a 2d image; for each pixel, if there were erase event(s), the latest writing before the last erasure is saved.
  i. Definition of double erasures/alterations: if two erase events at the same spatial location occur within a time interval, and only one key frame is saved in that time interval, then writing from just before one of the erase events must have been skipped (skipped as in, not captured in a key frame, which means it won't show up in the notes document).
  ii. Note: Later described is the process of key frame subdivision/splitting, which is more important when key frames are large. It is possible for an embodiment to aim to produce smaller key frames by relaxing some of the criteria here (examples being "maximizing the 2d surface area of saved writing" and/or "minimal total number of key frames"). This could allow for less key frame splitting/subdivision later, meaning that key frame splitting/subdivision is a process that could start earlier (immediately after writing change detection) in other embodiments.

c. Determining what quantity of writing events necessitates saving a key frame (listed below) can include more advanced features than those used to determine writing change events (listed above) because some key frame detection computations only need to run in the spatiotemporal vicinity of detected writing events (for example as a detector refinement). Writing quantification metrics can include:
  i. The number of, or total length of, strokes.
  ii. The number of symbols (such as alphanumeric characters).
  iii. Basic quantities like "number of pixels", which can be made relative to the typical number of pixels in a character of the presenter's writing's typical "font size."
  iv. The frequency of such events (for example, if the presenter is continuously altering portions of a diagram or entries in a table, such events may each be down weighted and the exemplary system may wait until the presenter is finished with the diagram or table).
  v. The semantic significance of the strokes (for example, key words that are emphasized verbally by the speech of the presenter).

vi. Relation to other elements (e.g., slide transitions, certain speech phrases indicating a new topic, etc.).
d. The "key frame" can include older writing around or between newer writing, to provide context. The new strokes can be labeled so that the document analysis algorithms know which pixels/strokes of the "key frame" are new and which are old/stale, to aid subdividing or rearranging key frames. If such stale writing is subdivided to a new sub-key frame which is entirely stale, it would be deleted as a means of deduplication.
   i. Saving "stale" writing is useful because the writing event detector may be noisy; some extra writing may not actually be "stale" if the event detector misclassified a stroke. A deduplicator algorithm can be used as a more precise refinement step.
e. The timestamp of every pixel/stroke can be saved as a 2d image in which each pixel is a timestamp value. The x/y spatial coordinates of the key frame (and thus each pixel/stroke by either pixel coordinates or an orthographic projection mapping) with respect to the original writing surface are also saved. Thus, each stroke and pixel has a 3d coordinate (x/y/time) that can be used to compare with other elements such as person gestures. These 3d coordinates can be maintained no matter how the final document is arranged in the user's displayed view, because displayed writing can always be associated with its original 3d coordinates at a per-pixel level using 2d image index mappings (as long as document generation maintains the mappings to the original coordinates).
f. Sample implementation embodiments:
   i. One simple embodiment of a key frame detection algorithm is a greedy algorithm that saves a key frame whenever the quantity of writing erased or altered passes a threshold.
   ii. Another embodiment of a key frame detection algorithm uses a beam search algorithm in which potential key frames are noted, and the optimization procedure prunes for a good subset of those potential key frames.
   iii. Scope of analysis: change detection and timestamping can be done at pixel level, stroke level, character level, or word level; less ideally, it could be done more coarsely at sentence/equation level or paragraph level.

Operations of Writing Enhancements+Detection (WED3) module 670 and Timestamp Refinement module 671 provides one or more of:
a. These functions operate on the key frames. There should be very few key frames (relative to the number of analyzed image frames from the video), so the exemplary system can be able to spend maximum computational effort to enhance writing and refine stroke timestamps.
b. Timestamp refinement can mean:
   i. a sparse-to-dense (from point cloud of writing change events, to 2d image) splatting algorithm (one splatted image per key frame), perhaps with some filtering such as hysteresis double-thresholding of the writing change events (e.g., two thresholds, "high" and "low" for writing change events; "low" events are deleted unless they are in the vicinity of a "high" event).
   ii. inpainting for spaces near strokes (some places on the board never had writing, but are near writing, so it can assume the timestamps of the nearest writing).
   iii. a matching algorithm for each stroke in the key frame to match and find the originating moments of being written.
   iv. look at events in context of the coarse stroke times, such as motions of the person's pose skeleton. The person may be standing in such a way that they block the camera when they write, so the exemplary system can analyze the posture and motion of their shoulders and arms to estimate when they are writing different words.
   v. be any of the methods described for writing change detection before (e.g., analysis of gestures of presenter, or tracking and analysis of physical erasers), perhaps with variations e.g., different thresholds.
   vi. if key frames are assigned just one timestamp value (one number for the whole key frame), then the refinement can be the selection process (e.g., median timestamp of writing strokes).

The outputs of Writing Enhancements+Detection (WED3) module 670 and Timestamp Refinement module 671 produce Refined & Enhanced Key Frames with Timestamps data 672.

Aspects of Keyframe/KeyGrouping Distortion/Splitting Text Adjustment module 674 and KeyFrame/KeyGrouping Arrangement; Interspersion of Other Data module 676 and Iterations/Optimization Criteria (Convergence) module 678 are described in greater detail below, beginning with the Key Groupings discussion and ending with the Examples of Optimization Criteria. The results of these modules produces the Finished Document with Metadata output product 680.

Other possible alternative embodiments are now discussed (different writing enhancement steps; skipping person detection; skipping key frames analysis). In particular, the order of operations (comprising one or more of the modules) may be altered according to an arbitrary stage number. That is, the respective modules that perform the various functions can be invoked in the stage order given.
a. In one embodiment, stage (1) is edge detection, stage (2) is contrast enhancement, and stage (3) is removal of chalk dust/stains and partially erased writing and refining timestamps of each stroke of the final key frames (some stroke times may have been missed by writing change detection due to writing enhancement (2) being less advanced than (3)).
b. In another embodiment, stage (1) is edge detection, stage (2) is contrast enhancement and removal of chalk dust/stains and partially erased writing, and stage (3) is refining timestamps of each stroke.
c. In another embodiment, "person detection" can be skipped for this module, then only the generic "foreground distractor detection" is used to detect and remove distractors (people are a generic foreground element, and usually move around enough to be detected by a temporal foreground/background classifier)
d. In another embodiment, the key frames analysis can be skipped, and the output made available for the user interface is simply the key frames (w/associated timestamps), without any further processing.

The following description covers operations by respective modules that provide the key frames-to-notes Document, using key frames and writing timestamps:
a. The notes document is formed based on key frames and related metadata. Algorithms are used to generate notes include splitting, writing adjustment, distortion, interspersion, and arrangement.

b. The exemplary system is able to at least one or more of subdivide key frames into spatially, temporally, and/or semantically smaller key groupings; distort and rearrange key frames and key groupings; edit writing style using effects seen in word processors (such as word wrap, bold/italicize, underline, etc.); and generate notes similar to what a human notetaker would create.

Definitions and Operational Decisions and Example Algorithms

It should be expressly understood that the list of operational decisions and example algorithms are presented to show some of many possible "intelligence" methods for achieving the final note taking resource(s). And that these described methods (or steps) are not to be interpreted as required in every embodiment or every implementation of the exemplary system. As, some of these "steps" can be considered as optional, depending on the performance desired and implementation requirements. Thus, some embodiments may be devised with lesser steps or methods, operational decisions, algorithms, and other embodiments may be devised with more or different steps and so forth, without departing from the spirit and scope of this disclosure.

Similarly, the e.g. abbreviation is understood to indicate a demonstrative example of a possible choice and is not to be construed as dictating it is the only choice to be used.

Key Grouping:
- a. Can be used to spatially subdivide (i.e., split) a larger key frame or larger parent key grouping.
- b. When not used for spatial subdivision/splitting, can be multiple overlapping key groupings (e.g., if semantic or temporal clusters).
- c. Metadata/features paired with each key frame and key grouping:
  - i. Each key frame/key grouping is paired with an image for which each pixel is a timestamp. There can be other metadata too:
  - ii. Each key frame/key grouping has summary statistics for its positioning features, including one or more of: timestamp (e.g., 75th-percentile-timestamp or mean timestamp); spatial position (e.g., center-of-mass of strokes) with respect to original writing surface and with respect to new notes document; average color of writing; etc. There can also be a semantic feature vector summarizing its semantic meaning, computed by OCR (like word2vec) and other analyses (e.g., diagram classification). The summary statistics and semantic feature vector form a feature vector used to compute (using e.g., a graphical neural network) relational forces to arrange key frames and key groupings.
    1. There may be multiple such summary statistics which collectively cover the span (e.g., semantically, spatially, temporally) of the key frame/key grouping; e.g., semantic topic modeling in which the content is summarized as 3 semantic concept vectors.
    2. When using distortions or other localized rearrangements like text wrapping, we would like to save the pre-distorted coordinates of writing: there can be an image (2d array) for which each pixel has saved its original spatial coordinates on the original writing surface; or there could be a spatial coordinate for each word from text detection.

Semantic Understanding: Algorithms can be run to generate an "understanding" of the written or drawn concepts; for each key frame and globally for the notes. Examples of such are described below.

Text can be extracted by OCR, and a semantic understanding of drawings or diagrams can be gleaned using machine learning algorithms (e.g., CNNs) that associate detected features (parts or key components of drawing/diagram) to semantic feature vectors (which represent concepts that can be described by text; as an example, GloVe word vectors).
- a. These can be useful to condition the writing understanding algorithms of document formation and key frame/key point arrangement.
- b. These can be useful to condition the speech-to-text algorithm (e.g., tune the prior frequencies of expected vocabulary.
- c. These can be useful to influence the NLP/topic modeling algorithms that summarize the presentation's content and link key concepts to other semantically related content.

Keyframe/Key Grouping Splitting, Distortion, Text Adjustment:

Splitting can be achieved by subdividing key frames/key groupings into spatially smaller key groupings, which preserves semantic relationships of writing while allowing for more flexibility in arrangement, improved human readability, and an efficiently accessible information structure. This process extracts any arbitrary segments of a key grouping to create a new key grouping, with an example being enclosing the key writing with a "simple closed curve"; this is called an enclosing shape and its enclosed writing a "key grouping". The enclosing shape is mapped to any metadata mapped to the key frame (e.g., timestamps image). A key grouping can represent a (spatially, temporally, and/or semantically) related group of writing such a section of material, single equation, multiple equations, a single diagram, a table or matrix; a word, sentence, or a paragraph or group of equations. Splitting can be accomplished by using any one or a combination of the following:
- a. Grouping writing based on at least one of: time of writing, location of writing, color of writing, style, size, human gestures, transcription data, manual annotations, semantic relationships, including:
  - i. Text relationships (e.g., math equation that runs on multiple lines).
  - ii. Diagrammatic relationships (e.g., arrows connecting writing).
  - iii. Conceptual relationships (i.e., same concept/topic).
- b. A split can be achieved using a splitting energy map computed using e.g., a CNN (see above, this term used here encompasses many algorithms that output an image map, such as a ridge detection filter). The splitting map is a scalar field image in which each local pixel or stroke is assigned a "splitting energy" that when positive acts as a clustering affinity (things in this vicinity should stick together) and when negative acts as a cutting guide. Then cut suggestions can be formed by an algorithm which minimizes total integral energy along the cutting path (e.g., seam carving); or clustering and maximizing energy within each cluster (e.g., DBSCAN). The features used to compute this energy map can include:
  - i. Density of writing strokes, in space and/or time:
    1. Location of writing.
    2. Time of writing being written or erased.

ii. Compactness of semantic content (clustered semantics in a local area).

iii. Any other algorithms.

c. Via text detection or OCR to:

i. Detect lines of text and/or mathematical equations and can hierarchically group them (e.g., words of a sentence, to sentences, to paragraphs). Other writing (like drawings/diagrams) can be clustered separately as non-text.

ii. Split whenever sentence or equation boundaries end (line end).

d. Splitting can be guided by presenter created indicators such as section symbols, "divider lines", or other indicator markings with this intent (drawn by the presenter to segregate content). Some presenters do this naturally, it can also be recommended to presenters as a tool to organize the notes that will be generated from their presentation.

e. Key grouping generation can also be aided by parsing presenter created section headers, section numbers, or other section designators.

Key Grouping Recursion Notes:

a. Key frames and key groupings can be recursively split with an option to encode hierarchical parent-child relationships.

b. Split key groupings collectively replace their parent key frame; during the arrangement step they can be moved independently or moved as a group (or with group influences to retain adjacencies). Subdivided key groupings inherit all the described properties of key frames:

i. Further subdividable, though subject to a recursion limitation criteria such as minimum size with respect to something like the estimated font size, etc.

ii. Arranged to form the document.

iii. Distortable/reshapeable.

iv. Animatable as videos.

v. Etc.

Metadata splitting options: If the key frame/key grouping is split, then associated timestamp image and other associated image-like metadata (e.g., original-spatial-coordinates image) are correspondingly split.

Writing Adjustments:

a. Adjustments are variable based on user settings. Notes can be optimized for specific use cases or for specific user requirements with examples being those with visual impairment (larger text, recolorization, etc.), for mobile devices (compactness, word wrap, size decrease, etc.), or for improved information scannability and accessibility (colorize sections, etc.). As adjustments are made, decisions are saved so that consistent choices are made across key groupings or key frames with an example being consistently recolorizing a specific symbol to a certain color.

i. Word wrapping: key frames/key groupings containing text (words or mathematics) can be reshaped with word wrap, like a word processor does: when the column/page width is shrunk, words at the end of a line are pushed down to the start of the next line. Wrapping can be done for mathematics too by splitting long equations (especially at common mathematical breakpoint symbols like equals signs).

ii. Writing Justification: The writing can also be justified in any fashion such as centered or aligned with the left and/or right edges. Justification can be vertical or horizontal. An example of use in a later step (arrangement) would be to modify a key grouping so that one of its sides fits better with the side of a neighboring key grouping, like fitting puzzle pieces.

iii. Style adjustment: Words and characters can have their style adjusted, e.g., boldness, italicization, underlining, and/or colorization. This can be used to emphasize content, improve readability through colorizing related writing, and stylization can indicate categories of writing. Examples include colorizing all occurrences of a symbol or underlining section headers.

iv. Kerning: spacing between related writing can be adapted, the exemplary system can estimate character sizes, space sizes, and can dynamically decrease spacing to create more compact writing groups or increase spacing to increase readability. Semantically related writing sub groups can be moved closer together and unrelated concepts can be moved further away from each other.

v. Relevance labeling: Detect if the presenter speaks off-topic (not relevant to the workshop/course/lecture, e.g., about their personal life) and demarcate it from the rest of the presentation (e.g., make writing a different color, or e.g., make it somewhat transparent/faded/etc.).

Text adjustment options: adjustments require usage of a word/symbol detection/segmentation, which is usually one step in an OCR pipeline; it can be done by such approaches such as:

a. CNN object detector (e.g., Faster-RCNN) predicting a bounding box for each word or mathematical symbol.

b. CNN predicting/segmenting lines, then the following or an equivalent:

i. An algorithm reading the line left-to-right (e.g., LSTM) detecting words.

ii. Another CNN module (conditioned with the line predictions) which predicts word groupings e.g., "associative embeddings" (scientific reference: Associative Embedding: End-to-End Learning for Joint Detection and Grouping) or "affinity fields" (scientific reference: "Realtime Multi-Person 2D Pose Estimation using Part Affinity Fields").

Distortion: Writing can be stretched (e.g., diagram enlargement, or font size change), locally warped (e.g., diagram stretching, or de-compactify writing squished against the edge of the board), or rearranged (e.g., moving bubbles in a flow chart, or straightening/horizontalizing multi-line math equations). The term "distortion" is used here to mean a more general process that may not necessarily use OCR. Distortions can increase or decrease the size of text with examples include increasing the size of small text.

a. Key frames/key groupings can be distorted by algorithms which predict a distortion map, like a CNN. The distortion map is a vector field image which suggests where each local pixel or stroke should be moved; it should be regularized to be spatially smoothed so that strokes of a character should be moved together. If the key frame is distorted, then associated timestamp image and/or original-spatial-coordinates image are correspondingly distorted.

b. Words and characters can be shifted as desired by the optimization criteria.

Interspersion of Other Data: During document layout prep, the exemplary system can also decide to intersperse other presentation data (from e.g., audio, transcript, or digital media) into the notes; either to make the notes more comprehensive in covering presentation concepts, or to reinforce important or otherwise confusing concepts or parts of the notes. Digital media can be from AV feeds, user provided, taken from electronic textbooks, or queried from the Internet.

Reason(s) for Interspersing Data:
  a. Making the notes more comprehensive with respect to the presentation.
    i. Not all material is written on the board. The exemplary system can compare semantic analysis of the spoken transcript (from speech-to-text) and presented digital media (if applicable) against a semantic analysis of the key frames to identify anything missing in the key frames that was covered by the speech or digital media. Anything missing should have some representation in the notes.
  b. Reinforce important or confusing concepts.
    i. Importance Detection: The exemplary system can detect importance by modeling the semantic content of the presentation, including at least one of OCR and analysis of the words, equations, and diagrams; analysis of the speech-to-text transcription; and analysis of digital media (presented text, images, videos etc.). With such modeling the exemplary system can summarize the presentation and identify key (important) topics/concepts.
    ii. Confusion Detection: The exemplary system can detect confusion, by semantic relationships (for example, this sample problem draws from several very different topics in mathematics, each topic requiring quite a bit of prerequisite background), or empirically by user interaction with the exemplary system outputs (for example, users frequently pause and replay a section of the video, hinting at its difficulty). In such cases we can reinforce.

Data interspersed with or overlayed on key frames/key groupings may include (but not limited to): Segments or summaries of the speech-to-text transcript; web links; links to other note or note sections; an image from a presented slideshow; images and/or video clips from a presentation slideshow; comments; 3d renderings of equations written on the board; 3d renderings of 2d drawings on the board; key groupings or other content from other lectures; question and answer modules (e.g., for use on the web); related media content such as images, video, or audio clips (e.g., if the presenter is talking about the statue of liberty, the exemplary system can use a web search engine to get an image of the statue of liberty to embed in the notes).

Key frames/Key Grouping Arrangement: The layout proposal arranges the key frames and key groupings. Each key frame's/key grouping's position is influenced by its own features (its summary feature vector(s)) by itself (for example, earlier timestamps should appear sooner/higher in the notes); by relative forces (e.g., semantic forces like related equations should appear together); and by document forces (don't run off the edge of the page; right or center text alignment, etc.). The arrangement is able to generate notes from most or all key groups to meet the optimization criteria detailed below, essentially to generate notes which are efficient for study and learning. Key groupings can continually undergo writing adjustment or splitting as the notes are being generated. Notes can be of any dimension and can be pageified like a document.

Steps:
  a. All key groups (adjusted in the writing adjustment step) can be initially sequentially numbered based on time, space, and semantic relation, etc. (for example, corresponding to KeyFrame/KeyGrouping Distortion/Splitting Text Adjustment module 674).
  b. Key groupings begin to be placed one by one on a document canvas (a constrained space). (for example, corresponding to KeyFrame/KeyGrouping Arrangement; Interspersion of Other Data module 678).
    i. When one is too large to fit in the constrained space (too wide, or too tall for a page if pageified), it will need to be split, distorted or its writing adjusted. Even if not too big the exemplary system may decide to split/adjust a key frame/key grouping for better global structure (e.g., If two key groupings have semantically related content, the exemplary system could split one of the key groups to move the related content closer to the other key grouping).
    ii. While placing, the exemplary system can consider the semantics of the next key frame/key grouping against previously placed content; this analysis includes criteria described below in the arrangement section (optimization criteria, and iterative rearrangement of next step). The next key frame/key grouping starts with a proposed position, and the exemplary system can rearrange/readjust the position of key groupings before it to better fit with the new key grouping.
  c. Iterative rearrangement: the exemplary system can iteratively organize and structure the information according to the optimization criteria; the exemplary system can do this re-analysis during the one-by-one placement and also at the end after all placement. This is a global semantic structuring using the key frames/key groupings as like puzzle pieces. (for example, corresponding to Iterations/Optimization Criteria (Convergence) module 678)
    i. Semantically related content should appear together (see listing of characteristics of semantic similarity below in "optimization criteria." For example, tuning whitespace (reducing or increasing between key groupings).
  d. Optionally, users can arrange and adjust key groupings manually using a graphical user interface (GUI).
  e. Optionally, the exemplary system can impact the placement of key groupings based on which segments of key groups should be near another. Semantically related subsections of a key grouping each have a keypoint which is an attractive force for other keypoints.
    i. Key points can be computed for each key frame or key grouping, representing clusters of key information within the key frame/key grouping. Such clusters group spatially, temporally, and semantically; and they may not be spatially compact or a spatially closed shape (if semantic/temporal cluster weighting forms better, denser clustering than the spatial aspect).
    ii. Advantages:
      1. Relational forces/influences can be computed between key points instead of (or in addition to) between entire key frames/key groupings; the total movement force on a key frame/key grouping can be the sum of forces on each of its key points.
      2. Forces are applied more locally at more relevant locations of content.
  f. Relationship to user-uploaded, presenter-uploaded, or other outside content (e.g., with respect to textbook): notes can be structured with respect to such sources (e.g., the notes can be structured to follow the semantic guidelines of the textbook, where a "semantic guideline" can mean e.g., a table of contents).

Student/Audience/User Options:
  a. Student notes may have been electronically recorded, or students may upload their own notes for analysis. In either case, when interspersing student notes, the exemplary system can treat their notes as a writing surface and analyzed.
  b. Definition: user-uploaded notes: e.g., scanned handwritten notes, e.g., file(s) saved by an electronic device (e.g., user typed a text document, or e.g., user wrote on an electronic tablet).
  c. Temporal information from student notes: The exemplary system can apply change detection if temporal information is saved by their electronic notetaking device (if they used one); the temporal information would need to be converted or extracted to a format suitable for us (described above as either point clouds of stroke writing events or images where each pixel is a timestamp). If no temporal information is available on user notes (e.g., they scanned electronic images of their physical paper notes), the exemplary system can treat their notes as key frames without temporal information, and use the rest of the notes system above (splitting key frames to key groupings, OCR, writing adjustments, etc.).
  d. Users can ask for their notes can be split into key groupings and interspersed into the presenter's notes, or vice versa (presenter's notes interspersed into their own notes).
  e. Users can ask for their own notes to be restructured to align better with the presenter-generated notes, or vice versa (presenter-generated notes restructured to align with the user's notes).
  f. The exemplary system may compute a "difference detection" between user-uploaded notes and the notes generated from the presentation. For example, it can detect topics the student wrote about in their notes, and what was in the presentation, and compares (checks for something missing or extraneous in student notes). Topic detection could be e.g., OCR, or semantic analysis of writing, or template matching of symbols.

Presenters can upload their own lecture notes that they may have written independently before or after the presentation; then their own notes can be interspersed with the notes generated from the presentation (there can be a deduplication procedure that reduces duplication of e.g., topic/equation/sentence), for sharing with audience/students; or the auto-generated notes can be restructured according to the presenter-uploaded notes (e.g., to semantically flow better, if the presenter better organized their own notes in retrospect).

An outside or alternative source (e.g., pages from a textbook, or a table of contents saved in a text file, or a webpage that the presenter may have used as a reference/guide, or a PDF document, or a powerpoint slides file, etc.), can also be used to guide the structure of the notes (to organize the semantic flow), by semantic analysis (OCR, topic analysis) of the provided source. Such content can serve as an "invisible guide" (used to help structuring the notes, perhaps as if it were to be interspersed but is not interspersed) or can be interspersed with the notes document.

Definition: "semantic flow": the organization of/sorting of/layout of concepts/topics in the notes.

Some Optional Optimization Criteria:
Defines quantitative criteria of success; analyzes the current state of the proposed document to measure how well it meets criteria; and decides if it should loop back for another iteration of splitting, distortion, rearrangement.

Tasks that utilize the optimization criteria:
  a. Splitting
  b. Writing Adjustment
    i. Text adjustments (e.g., word wrap, bold, . . . )
    ii. Distortion
  c. Interspersing
  d. Arrangement Examples of Optimization Criteria:
  a. Human Readability.
    i. Reduce excessive empty space between writing which has no semantic justification.
    ii. Increase empty space between writing if an increase in space decreases human time to read (e.g., kerning, or vertical and horizontal spacing between words and consecutive lines).
    iii. Adjusting boldness, italicization, underlining, and/or colorization to emphasize or de-emphasize things.
      1. Can be for accessibility.
      2. Can be for correlation with the vocalization (e.g., pitch or intonation) of the presenter.
      3. Can be for correlation with the semantic importance of the concept (especially as guided by the presenter).
      4. Titles and topic headers.
  b. Preserving semantic relationships of writing.
    i. Concepts that were adjacent in the original presentation (conceptually/semantically adjacent, adjacent in space as drawn, or adjacent in time) are adjacent in the resulting document.
      1. When keeping related content together, arrangement forces (moving key frames/key groupings with respect to each other) may include one or more of the following features (similar to clustering/splitting criteria above):
        a. Time (try to maintain temporal ordering).
        b. Space (try to maintain relative positioning on the original writing surface).
        c. Color (of writing marker/chalk)
        d. Writing Style (e.g., Thin vs thick chalk, cursive writing, font size, etc.).
        e. Semantic content, inferred by e.g., OCR or neural network features.
          i. Text relationships. Example: math equation that continues on multiple lines.
          ii. Diagrammatic relationships. Example: arrows drawn between parts of a large figure or figure titles/axis labels.
          iii. Semantic relationships. Example: Material (text, figures) describes the same educational concept.
  c. Efficient information structure.
    i. Usually follows the spatiotemporal and conceptual flow path of the original presenter, for easier recall (to improve cued recall and serial recall).
    ii. Consolidates (e.g., chapterizes), summarizes, and/or emphasizes key concepts.
    iii. Arrange for efficient information structure.
    iv. Key groupings of the same or related topic can be placed near each other.

Definition of "Finished Document" 680 can be one or more of:
  a. As a consistently viewable & printable document, the computed product is one or more fixed-size documents (e.g., arranged as "US Letter"-sized printable document); this is computed on a server once and then distributed to users. It can be of any specified shape and size.

b. The key groupings and relational metadata can be used to dynamically generate notes on a user's display (to support different viewing devices with different display interfaces); the computed product is a set of positional features and affinities that allow the user's device to rearrange its display with only light computation. The rearrangements could also be a set of presets (e.g., "mobile", "desktop", "VR", . . . )

c. A document customized for each user that incorporates their own written notes with the presenter's notes (or is still presenter's notes but organized to map to the layout of the student's notes, e.g., so that it would be easy to see both side-by-side); or other customized documents described below.

d. The document can be the entirety of the presentation or parts of the presentation or as the presentation is occurring as in a live notes (or realtime generation) scenario.

Live notes: Note generation can be done in realtime so that users can see notes on the exemplary system platform (e.g., website webplatform) as the presentation is being given. Users can also annotate, write, and comment on notes while they are being generated. Users can access notes and their annotation on the exemplary system webplatform and can create new annotations post presentation.

During live presentation, the realtime notes can be simple placements of key frames/key groups (key frames split when necessary) one-by-one to fixed positions (without rearrangement once placed). This is beneficial because writings positions may be in flux during the arrangement optimization causing confusion. This can provide easier image consistency when following along live. Students (or e.g., audience) can annotate these live notes during the presentation and can intersperse their annotations/writing into the notes. When both student and presenter are writing, the placement of new writing from presenter could go: around student notes, or alongside student notes (e.g., separate column), or either could be a transparent overlay. The notes can auto-scroll as new content arrives.

After the live presentation, the live notes can be rearranged as described in "arrangement" section (improved semantic structure etc.). The user may be allowed to choose whether they want to view the live notes as they were generated, or the postprocessed restructured notes. If student/audience member made their own annotations/notes during the live stream, they can choose to create a custom document that will consider their own writing: e.g., intersperse their own notes with the presenter's writing, or structure the presenter's writing according to the student's notes.

Figure 6:
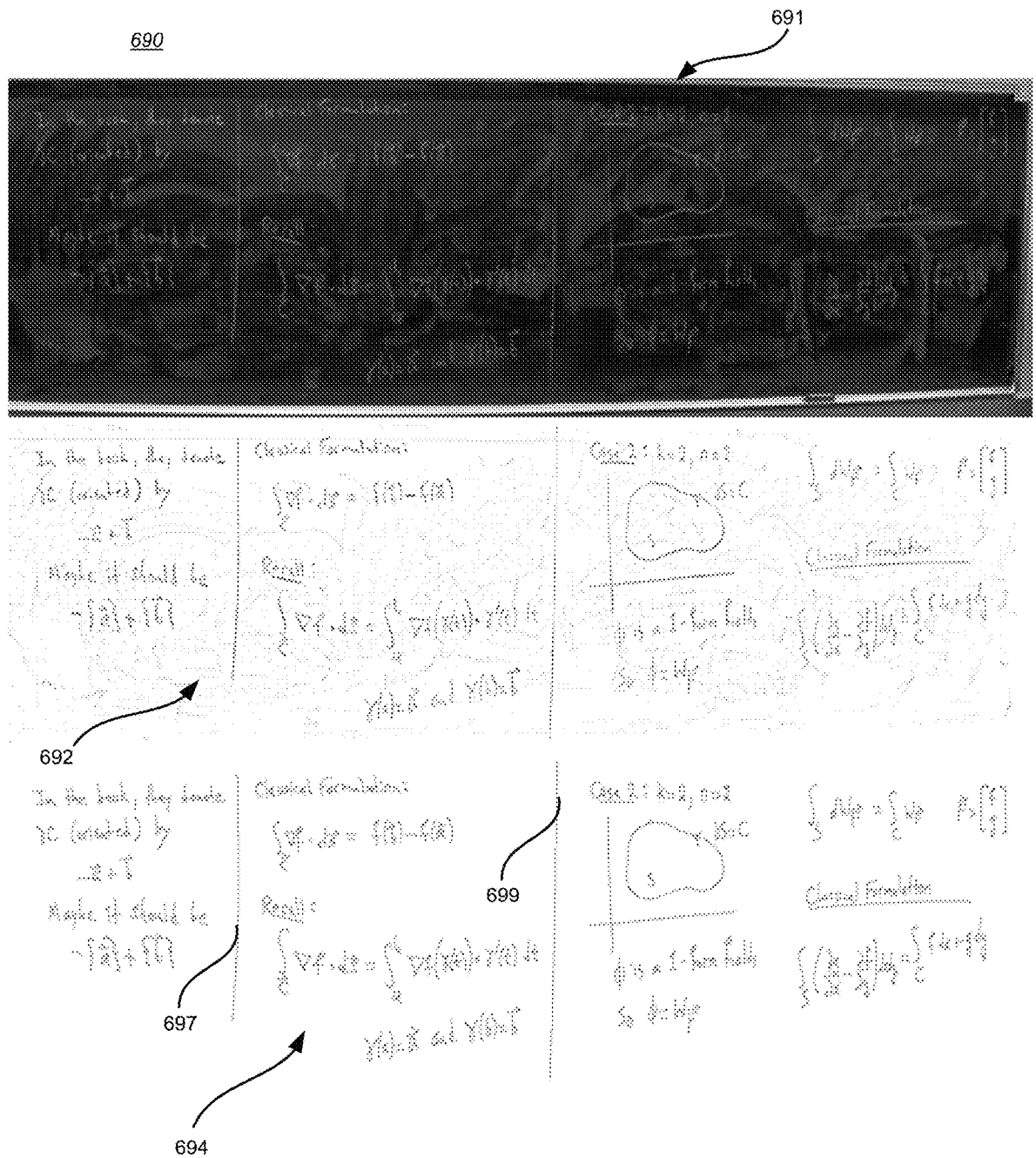
FIG. 6 is an example of the exemplary system's ability for writing denoising and enhancing an original video image at a given time, as shown with formulas on the black board.

FIG. 6 is an example 690 of the exemplary system's ability for writing denoising and enhancing an original video image at a given time, as shown with formulas on the black board 691. This example is broken, for explanation purposes, into 3 vertically stacked parts: Top raw image frame of black board 691 from the camera video (presenter is coincidentally out-of-frame); Middle representation 692 of Writing Enhancements+Detection (WED1) 653 per FIG. 5B (this can be a simple difference-of-gaussians filter, noting chalkdust is still visible); and Bottom representation 694 of Writing Enhancements+Detection (WED2) 660 (here, the chalkdust effect is shown as removed). The exemplary process has the writing detected, binarized and thinned (so writing lines are 1 or more pixels wide, and the image is cast as binary white/black).

The lines 697, 699 demonstrate key frame boundaries for subdividing and rearranging as part of a notes document. It is noted that key frames are taken from the "enhanced writing video", which may look like either the Middle representation 692 or Bottom representation 694, depending on whether the filtering for the Bottom representation is done for all frames or only for key frames. Also, key frames are not necessarily a whole image from the "enhanced writing video", they may be just part of it: whatever writing was fresh (i.e., not captured by previous key frames). Since this example represents a large and wide key frame, it is easier to see that it can be split up to be conveniently browseable and printable, and the next use of this example will show such splitting/subdivision.

Figure 7:
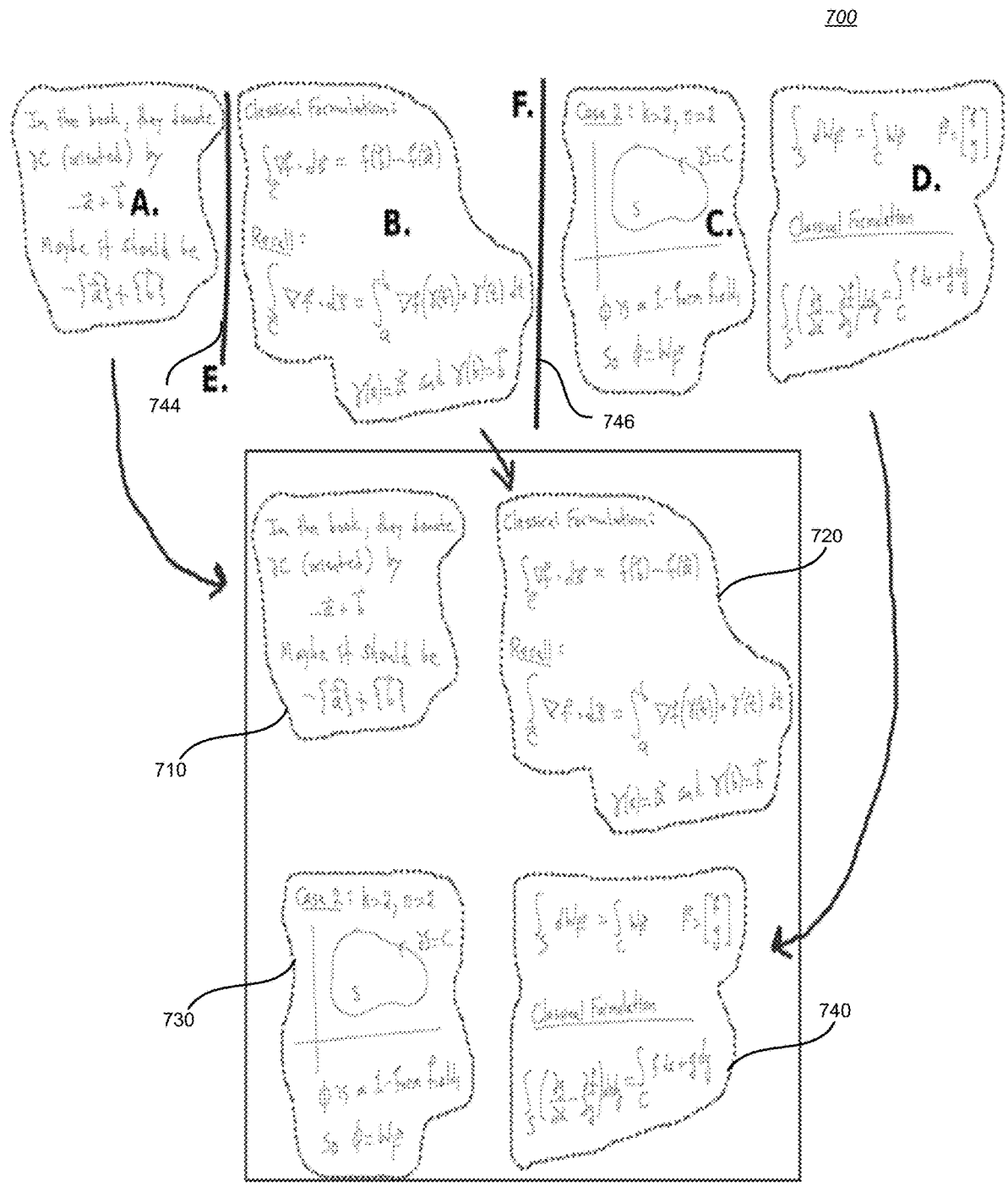
FIG. 7 is an example of writing reordering (splitting/subdivision) for rearrangement based on the illustration of FIG. 6.

FIG. 7 is an example 700 of writing reordering (splitting/subdivision) for rearrangement based on the illustration of FIG. 6. Here the exemplary system depicts a process of splitting the key frame into four key groupings and rearranging the key groupings to fit in a conveniently printable aspect ratio (instead of the very wide aspect ratio of the original chalkboard). The four key groupings are labelled "A.", "B.", "C.", "D." And are recast in the lower section of FIG. 7 as 710, 720, 730 and 740, respectively. No distortions, no text rewrapping, no OCR or semantics are used in this example. This example is just key frame subdivision and a simple rearrangement of the splitted parts. The imaged presentation content is simple (easily visually segregated into key groupings); there are other complications in presentations not shown (e.g., the presenter draws an arrow between two distant words; if the words were in separate key groupings, when the key groupings are rearranged, the arrow between them could be cut or distorted in a way that it loses its effectiveness. Ideally the arrow would be detected as such, and a vector graphics software tool could draw a new arrow with the same inter-key grouping connection meaning).

Two tall vertical lines 744, 746 are shown in bold: 744 separating key groupings "A." and "B." is labelled line "E.", and 746 separating key groupings "B." and "C." is labelled line "F." Line "F." represents a physical boundary between two large sheets of chalkboard surface, where a seam is visible (in the seam, chalk dust builds up/is collected. This seam is a static fixture of the writing surface—it is almost always there, for every presentation) so can be compensated for (i.e., subtracted as non-writing). Some presenters like to avoid writing directly over it (here it is somewhat faint, but in other rooms the border between boards can be more prominent, like an inch wide); so it can provide a hint to a segregation algorithm that that line might be able to form a segregation boundary, if it follows "divider line" criteria (see below when discussing line "E.").

Line "E." was drawn by the presenter, for the intent of visually separating content of key grouping "A." from content of key grouping "B.". Divider lines can provide hints (energy guides) to algorithms that make cuts to segregate clusters of writing. The exemplary system can take advantage of this by an algorithm which detects such "divider lines" (drawn by presenters to visually segregate regions of their content) as long salient lines with the following features:

a. The line is long: much longer than the strokes that form letters/words; usually only diagrams/figures have lines of similar length.

b. The line is isolated: typically, along the length of the line, there is free space around it (unlike the strokes that form letters, or often in lines that form part of a diagram).
c. The line is mostly straight: observationally we notice that presenters who draw these divider lines draw them with long straight segments (there may be a few bends, but the overall average curvature is typically low, lower than drawings/figures).
d. The line does not form a closed (nor nearly closed) loop: if it did, the line would probably have a different meaning (perhaps circling some important phrase).
  i. It often forms a division between the writing in time:
    1. nearly all of the writing on one side of the divide has been written before the start of nearly all of the writing on the other side.
    2. and/or, there is a significant gap (e.g., 15+ seconds) between writing on one side and the other.

There are multiple ways of thinking about how to form key groupings "A.",
a. Clustering writing: grouping strokes (semantically, temporally, stylistically, by color, or by spatial proximity).
b. Generating cutting lines that optimally separate writing: analogous to using graph cut algorithms for optimally finding cuts that separate clusters.
  i. Can use an energy field (2d image, at each pixel is an energy score, positive meaning "this is writing that should stick together", zero meaning "this is a blank space, cutting wouldn't cost anything", and negative meaning "it is suggested that cuts should run through this spot."
    1. Cutting algorithms would try to minimize the total score along the cut path; "seam carving" is an example of an algorithm that solves this problem quickly with dynamic programming (given certain constraints about the cut path, like no looping/backtracking).
  ii. For example, it would be easy to draw a vertical line separating key grouping "C." and "D.", because there is a gap (this line could be found by e.g., vertical "seam carving" optimal energy map). It would not be easy to draw a line down through the middle of "C". because of the text and figure.
  iii. Cutting lines can follow guides like "E." and/or "F." (as mentioned, along the divider line there can be a slightly negative score to guide cuts).
    1. Since detection of divider lines is a probabilistic process (based on a detector algorithm that may not be 100% accurate), the energy assigned along its length, while negative, should not be too negative (in case of error). The weighting (scaling of negativity) should be monotonically related to the confidence of it being classified as a divider line.

The key groupings are circled in dashed/patterned lines for visual convenience (for this diagram/figure), not necessarily in the produced document (although in an embodiment of a user interface, these boundaries can be displayed as a highlighting mechanism upon curser/finger hover).

Each key grouping retains the timestamp information for each pixel (thus for each character stroke) as a 2D image (mentioned previously).

Key frames and key groupings can be saved as independently animated videos, for users to be able to see the progression of writing within each key frame/key grouping (since each key frame/key grouping can represent a nicely compact idea/concept such as a single example problem).

Figure 8A:
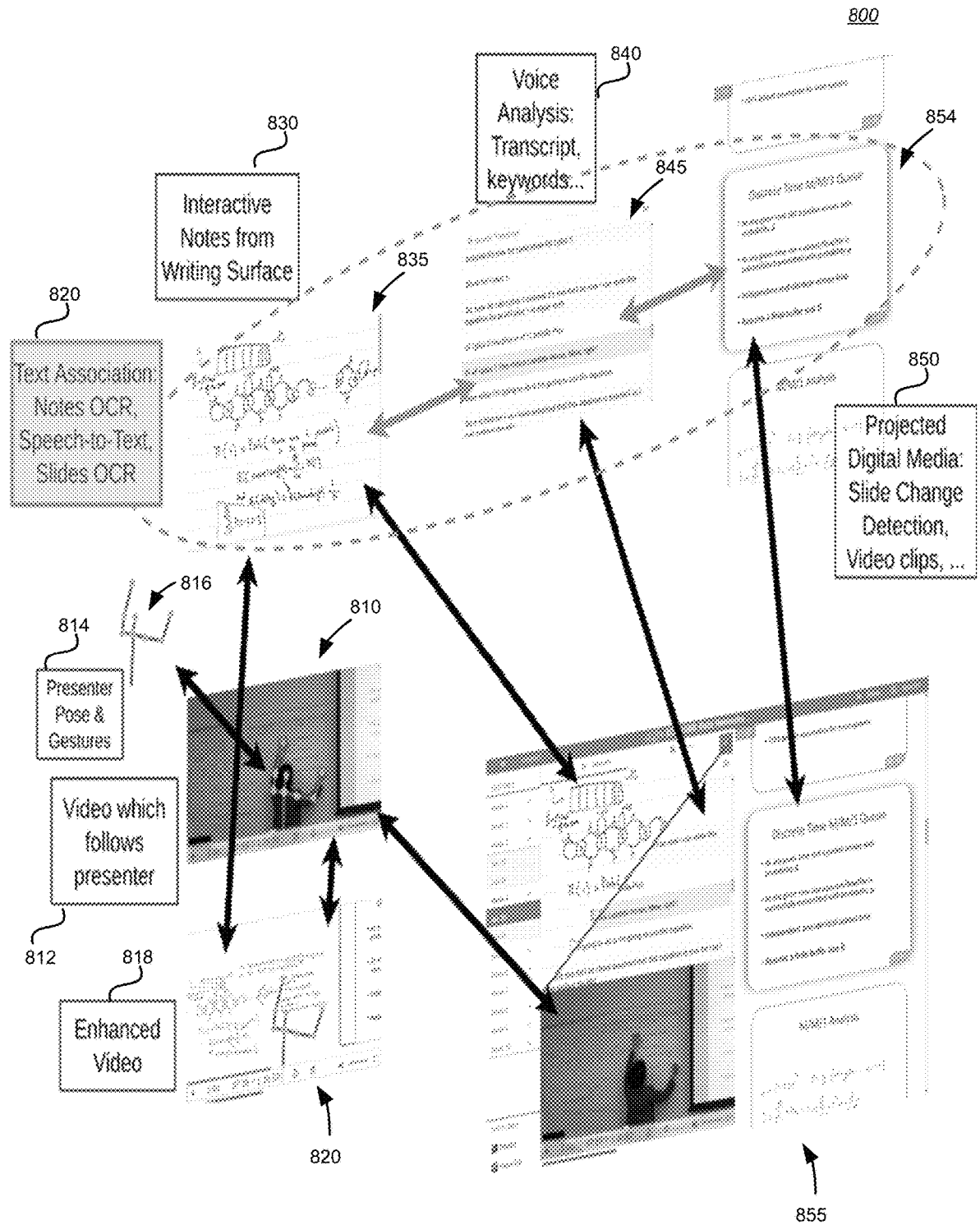
FIG. 8A is an illustration showing a possible multiple source-to-composite image-destination arrangement, using the abilities of the exemplary system.
Figure 8B:
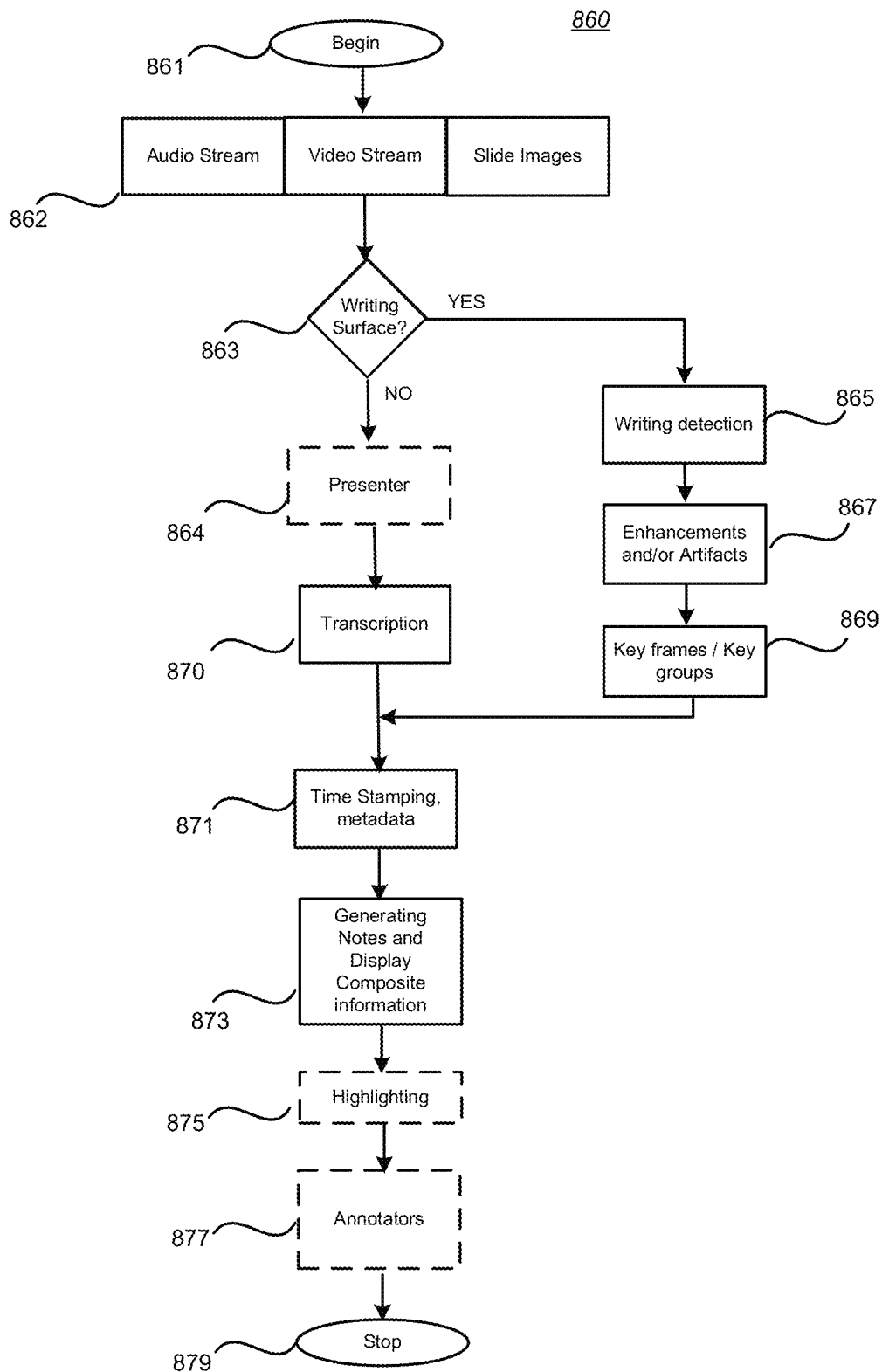
FIG. 8B is a process flow diagram showing a first order simplification of the embodiment shown in FIG. 8A.

FIG. 8A is an illustration 800 showing a possible multiple source-to-composite image-destination arrangement, using the abilities of the exemplary system. This FIG. illustrates a full suite of "information/video" panes that can be presented to a user for presentation study and notetaking. The user can also, in some embodiments, add his/her own notes to the various panes that provide interactive notetaking. Aspects of the audio and video data input are shown parsed out, processed and rearranged onto an exemplary, user controllable interface 855. For example, video of the presentation 810 is captured as Video which Follows Presenter 812 data, which is processed by exemplary modules described above to determine the Presenter Pose & Gestures 814 data, wherein a model of the presenter is generated 816. A resulting Enhanced Video 818 data is generated with the reconstituted presenter image as notetaking resource video 820 (shown here with the presenter in "wire frame," but ultimately shown in user controllable interface 855 as a full presenter image).

Information captured on the writing surface from 810 is processed by exemplary modules described above for Text Association: Notes, OCR, Speech-to-Text, Slides OCR 820 data. Additional processing provides Interactive Notes from Writing Surface 830 data which is output as notetaking resource writing 835. Processing on voice is performed to obtain Voice Analysis: Transcript, keywords 840 data which is output as notetaking resource voice 845. From projected/image data provided by the presenter, Projected Digital (may be analog) Media: Slide Change Detection, Video clips, etc. data 850 is obtained, which is output as notetaking resource media 854.

The resulting above notetaking resources (from the different data sources) are then aggregated to be displayed on a user controllable interface 855, typically viewable per a webpage interface (or downloadable as an app or running program on the user's device) from the conversion entity's website or distribution server. Therefore, presentation component, notes component, video component, transcript component, projected media component can be laid out in one embodiment on the exemplary system's website or on a user's device. In some embodiments, blocks of names (or representations) of these components can be presented versus the actual content. That is, the user's display real estate may be limited, necessitating a collapsed, hidden or shrunken component due to the spacing, but viewable upon an action by the user. The respective resources are associated by timestamp (when written, when spoken, when displayed), and can be scrolled through, searched, etc.

Other arrangements, combinations, scaling, warping, visibility and so forth than shown in FIG. 8A may be implemented. It is noted that some features of the many available options are not shown and may be added in other embodiments (examples—live-annotating notes document, hyperlinks to external information, embedded information from external information, prior student's notes, other student's notes, etc.).

Figure 8C:
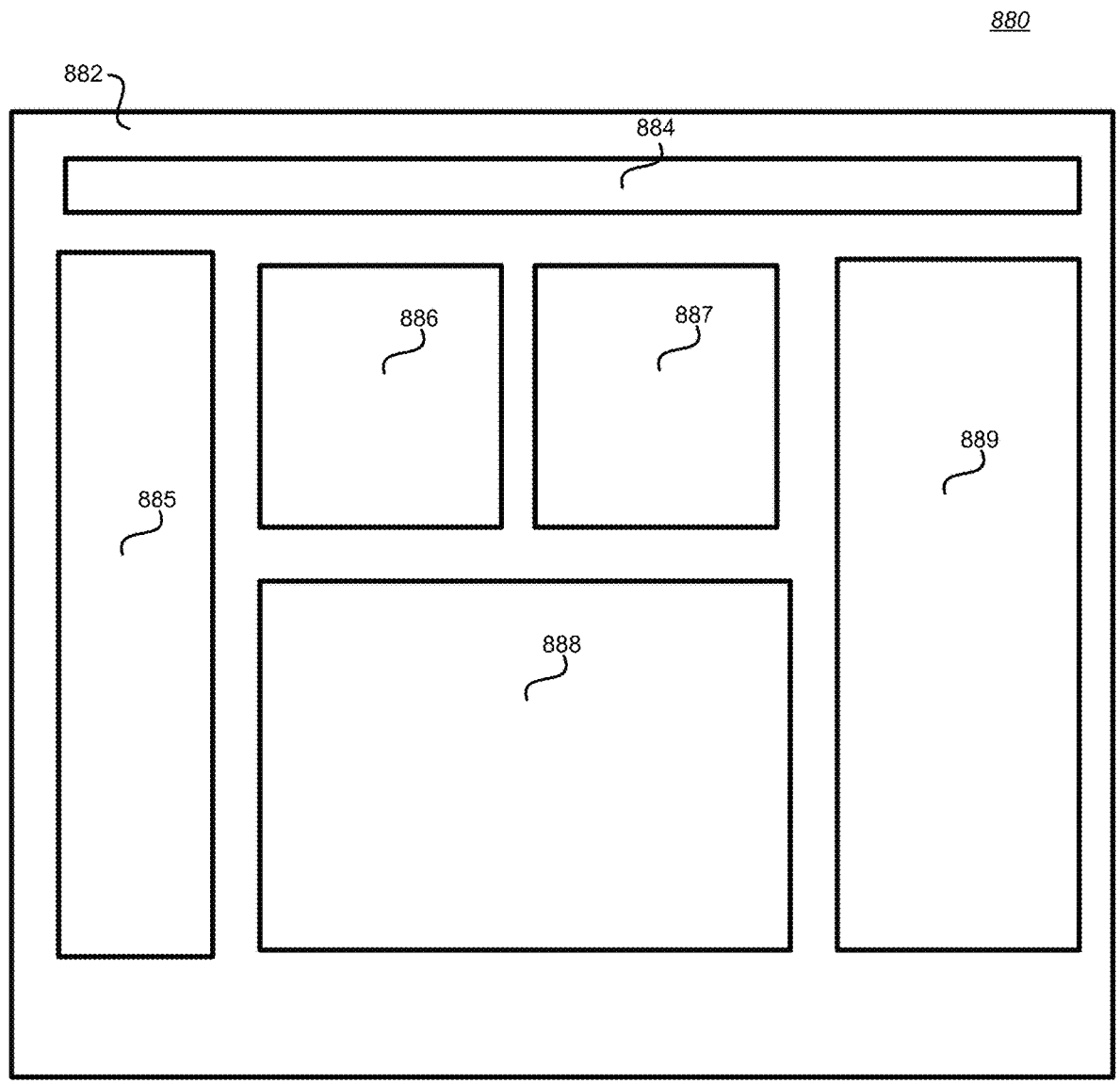
FIG. 8C is another view of an exemplary interface showing modular aspects of the interface.

FIG. 8C is a process flow diagram 860 showing a first order simplification of the embodiment shown in FIG. 8A. However, as apparent from the above and following descriptions, numerous variations, changes, modifications and additional steps, may be implemented to obtain increasing degrees of competencies and utility to the notetaking resource(s) for the end user. Thus, as clearly seen in the previous and following Figs, alternative embodiments can contain significant additional capabilities and functions than now discussed.

The exemplary process 860 begins with step 861 which accepts media input 862 for processing and conversion to the final notetaking resource(s). The media is typically video (images) with embedded slide images and audio of the presentation. If a display or projector (i.e., video aid) is used, the exemplary process also processes its input (either from an output of the video aid or from analysis of the video stream/image).

For an embodiment that is configured for writing surface/writing detection, step 863 operates to distinguish and determine the writing surface (if used) from the video stream or image in the video. This can be algorithmically performed or by human assistance.

In embodiments that are not configured for writing surface/writing detection, step 863 may be bypassed and the process may jump to optional step 864 or 870. If the former, then step 865 begins to detect the writing in one or more of the video/images/display. Thereafter, step 867 operates to clear up artifacts that may make the writing difficult to recognize and/or as well as provide enhancements to the writing. Next in step 869, key frame and/or key groups are determined from the detected writing. Next, the process proceeds to the time stamping, metadata phase in step 871.

If in step 863 above, no writing surface is detected or indicated, then the exemplary process can proceed to an optional step 864 to determine if a presenter is in the video. If present, then appropriate tagging is performed. Next a transcription of the audio stream is performed in step 870.

In step 871, a time stamp metadata is associated to one or more elements in the video, the audio stream, transcript text, and slide images (extracted from the video or from a slide presentation device output). If writing is determined in step 863, the associated key frame and/or key groups are also time stamped with metadata. The time stamp metadata provide time "markers" that correspond to related or corresponding time in the video, as well as the audio, as well as any other desired data or media, whether internally originated or external. Thus, all media elements time linked, time ordered and synchronized to each other. From this linking, in step 873, the notetaking resource(s) is automatically generated and a displayable in a "composite" format. For example, from a user's perspective, the components or elements of each media type and, if present, key frame and/or key groups are displayed in one or more panes but in a unified, composite interface. Various layouts are possible but the video stream, audio playback, slides and corresponding writing elements (i.e., all of or parts of key frame and/or key groups) can be displayed together.

Subsequent steps are optional steps, but are nonetheless described here. In optional step 875, when viewed by the user, respective portions of the displayed one or more elements in the video, the audio stream, transcript text, slide images and associated key frame and/or key groups are synchronously highlighted during playback. Therefore, the user can easily track across all media types (and converted forms) presently being discussed by the presenter. In optional step 877 the user interface is also annotated to allow the user to control or shift to other time periods, the operation of the "playback" with matching aspects of each pane's subject. The term annotators is used, however, other terms, such as icons, scroll indicators, clickable buttons, action links, etc. may be used, understanding the desired object for these functions is well known in the software arts. The visibility of the annotators may be context sensitive, that is, action results from an annotator may be available only during a specific portion of the playback, thus the annotator may "appear" for that period only. For example, the availability of a linked speech-to-text section may only be available during periods when the presenter speaks. The annotators can be configured to allow "control" of the appearance of the various sections or elements within the pane(s)—zoom, skip, etc. They may also indicate the length of time on a given subject or topic, or if there is audio data that corresponds to a subject (shown in some other embodiments, for example as a microphone icon).

As an example of operation, the user may want to revisit an earlier section of the presentation and (via a pane control or annotator, etc.) rewind the video to a desired topic or time. The respective time-matching elements of the key frames and/or key groups will also rewind. Audio element(s) will also time match rewind. Conversely, the rewinding can be initiated from the element's selection, rather than via a video selection option. That is, clicking on formula or transcript text, or sublevel video portion may bring up the relevant video portion and audio portion. Or, all relevant tagged sections may be brought to view, allowing the user to select which particular item he or she is wanting to review. The utility of this feature cannot be overstated.

Not shown in this Fig., but detailed in other portions of this disclosure, a partial display of the transcript (if provided) can also be viewed and "rewound" or moved about, triggering a matching movement by the video and elements of the transcript text, key frames and/or key groups. Of course, there are multiple other options, as discussed in this disclosure, that can be added to the simple process shown here. Step 879 represents the stopping of this process 860.

FIG. 8C is simply another possible alternative arrangement 880 than that shown in FIG. 8A, showing a desktop 882, with header/control bar 884 and respective panes, windows, portions, or sections of the interface 885, 886, 887, 888 and 889 for placement of the various outputs and notetaking resources. Of course, other arrangements, shapes, combinations, layouts and so forth are understood to be within the ability of one of ordinary skill and therefore such changes are within the scope of this disclosure.

Figure 9:
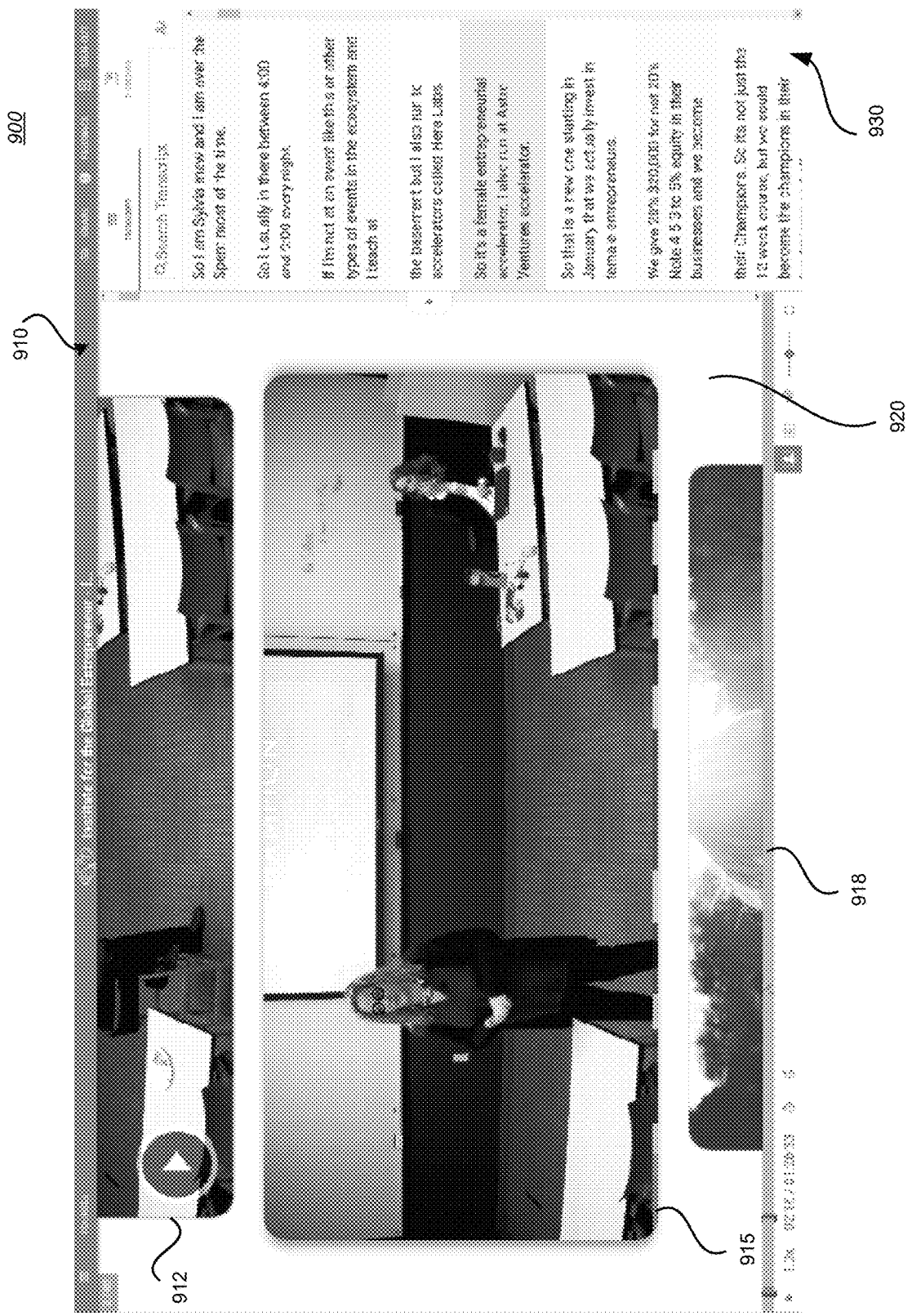
FIG. 9 is another view of an exemplary interface with a video or image pane showing a lecturer in a central position with previous and future views, placed above and below, respectively.

FIG. 9 is another view 900 of an exemplary interface 910 with a video or image pane 920 showing a lecturer in a central 915 (currently being viewed by user) position with previous 912 and future 918 views, placed above and below, respectively. The format of viewing can be segmented as shown, with "next" images scrolling or coming into view (optionally, left-right, etc.) when the respective time frame is watched by the user. The image pane can be images (still) or video images, or combinations. The user can click on the previous or past views to maneuver through the presentation, or move a time bar (not shown). The images/videos can be modified to enhance, remove, etc. the presenter and/or images in the background, as discussed in the previous sections.

A text transcript pane 930 provides a visual transcript of the lecturer's speech or other text desired by the lecturer. The transcript can similarly "scroll" with the image pane's 920 image/video to be time-matched. The user may select a desired text to immediately shift the video to that text's recitation in the video. Similarly, a search of text/words/etc. may be initiated with corresponding video shift. Implicit in the interface 910 is the understanding that audio of the lecturer is also played, and time-synchronized with the image pane 920 and the transcript pane 930. As the lecture video & audio plays, the transcript can highlight the words as they are being said. All resources are synchronously connected using metadata to produce the highlights. Various standard "annotators" are also possible in the user interface 910, which can be zoom controls, speech indicators (mute, volume up, fast forward, time back, time forward, etc.), external links, scroll down, up, page up, down, collapse, open, and so forth. The video component can have all the standard annotators or controls, such as fast forward, reverse, skip, etc. and etc.

Figure 10:
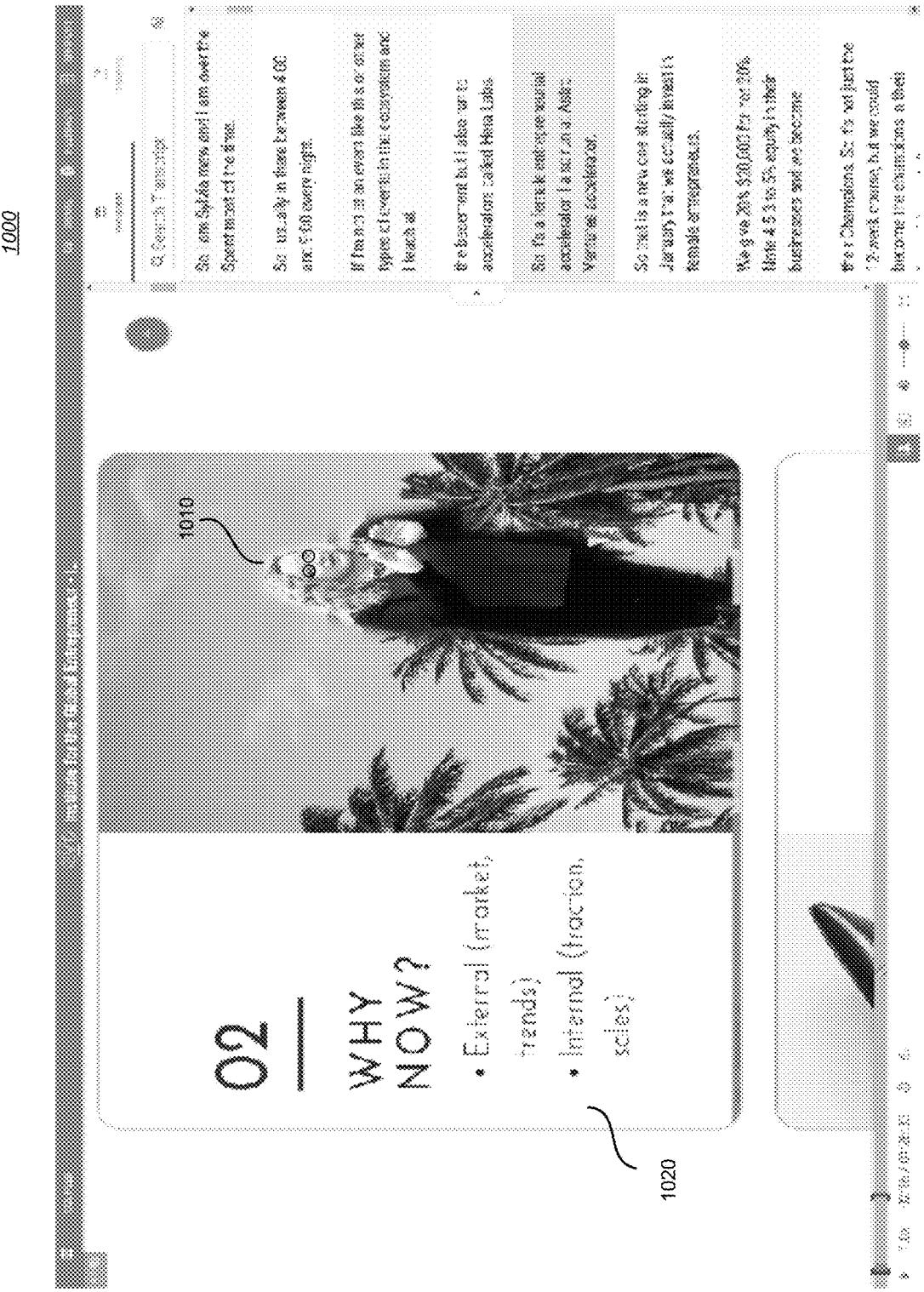
FIG. 10 is another view of an exemplary interface with the lecturer intelligently embedded into the view of a slide or the visual aid being used.

FIG. 10 is another view 1000 of an exemplary interface with the lecturer 1010 intelligently embedded into the view 1020 of a slide or the visual aid being used. Other options such as ghosting, cartooning and so forth may available, depending on implementation preference.

Figure 11:
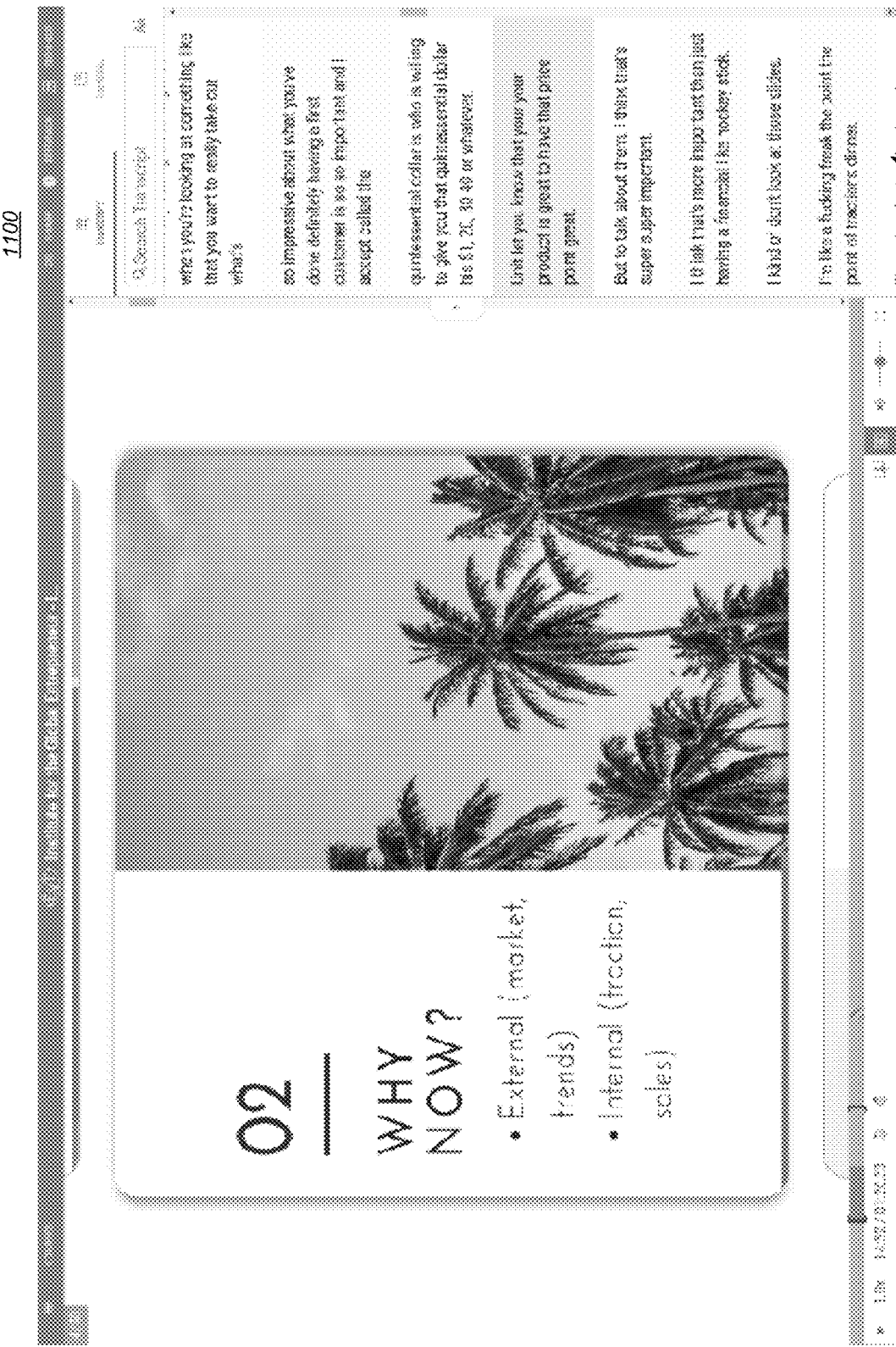
FIG. 11 is an illustration of a modified view of FIG. 10, with the lecturer removed from the slide's view, by a user toggling a button or annotator.

FIG. 11 is an illustration 1100 of a modified view of FIG. 10, with the lecturer removed from the slide's view, by a user toggling a button or annotator.

Figure 12:
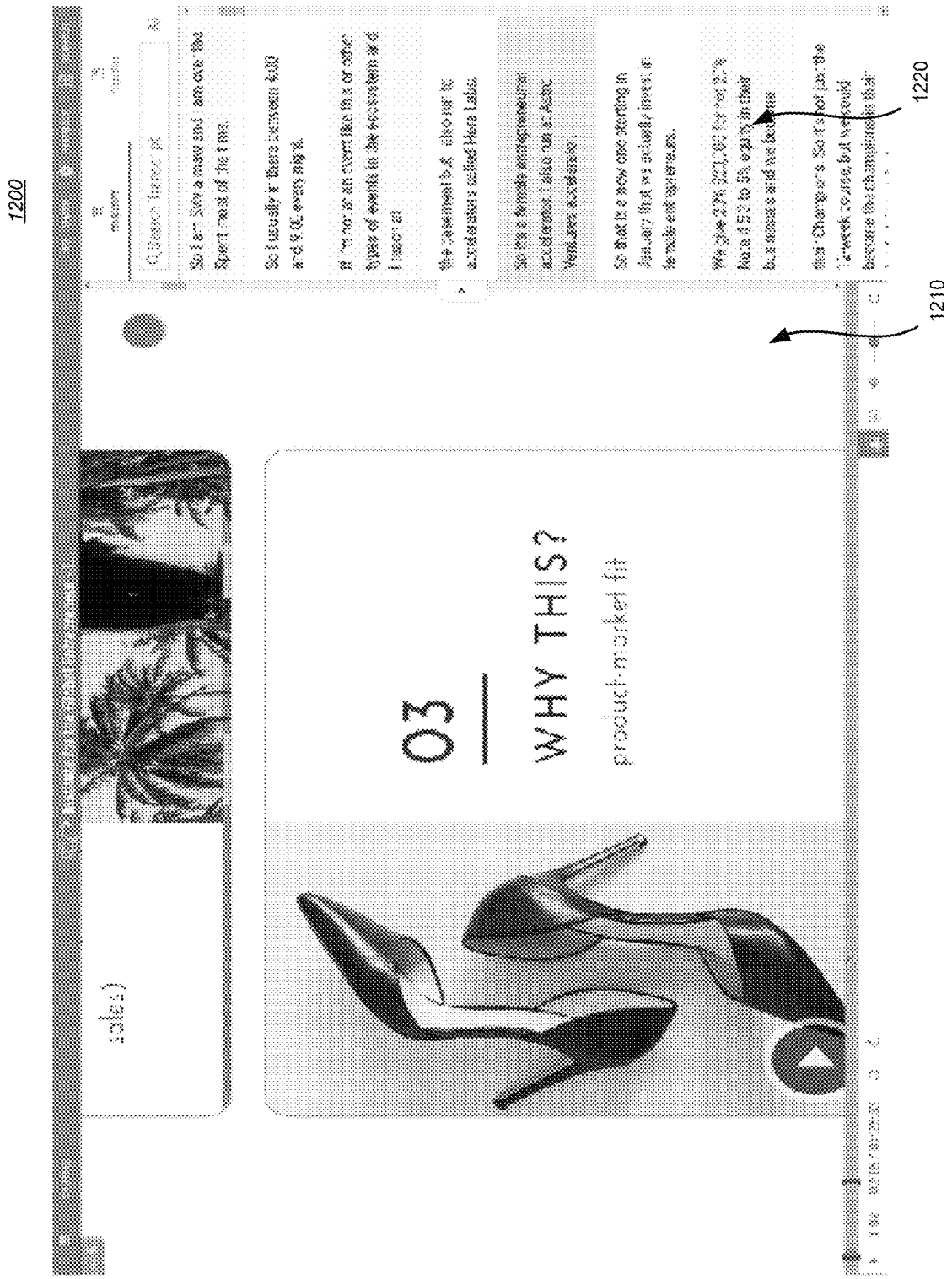
FIG. 12 is another view of an exemplary interface with composite "scrollable" slide pane and transcript pane.

FIG. 12 is another view of an exemplary interface 1200 with composite slide pane 1210 and transcript pane 1220, illustrating the ability to "scroll" to another slide element while the slide video is playing. Here, the user can override the foremost image/video with whichever image/video he/she wishes to view, while still listening or having the now-playing video in the background/hidden from view. This enables the user to preview other slides without halting the current video.

Figure 13:
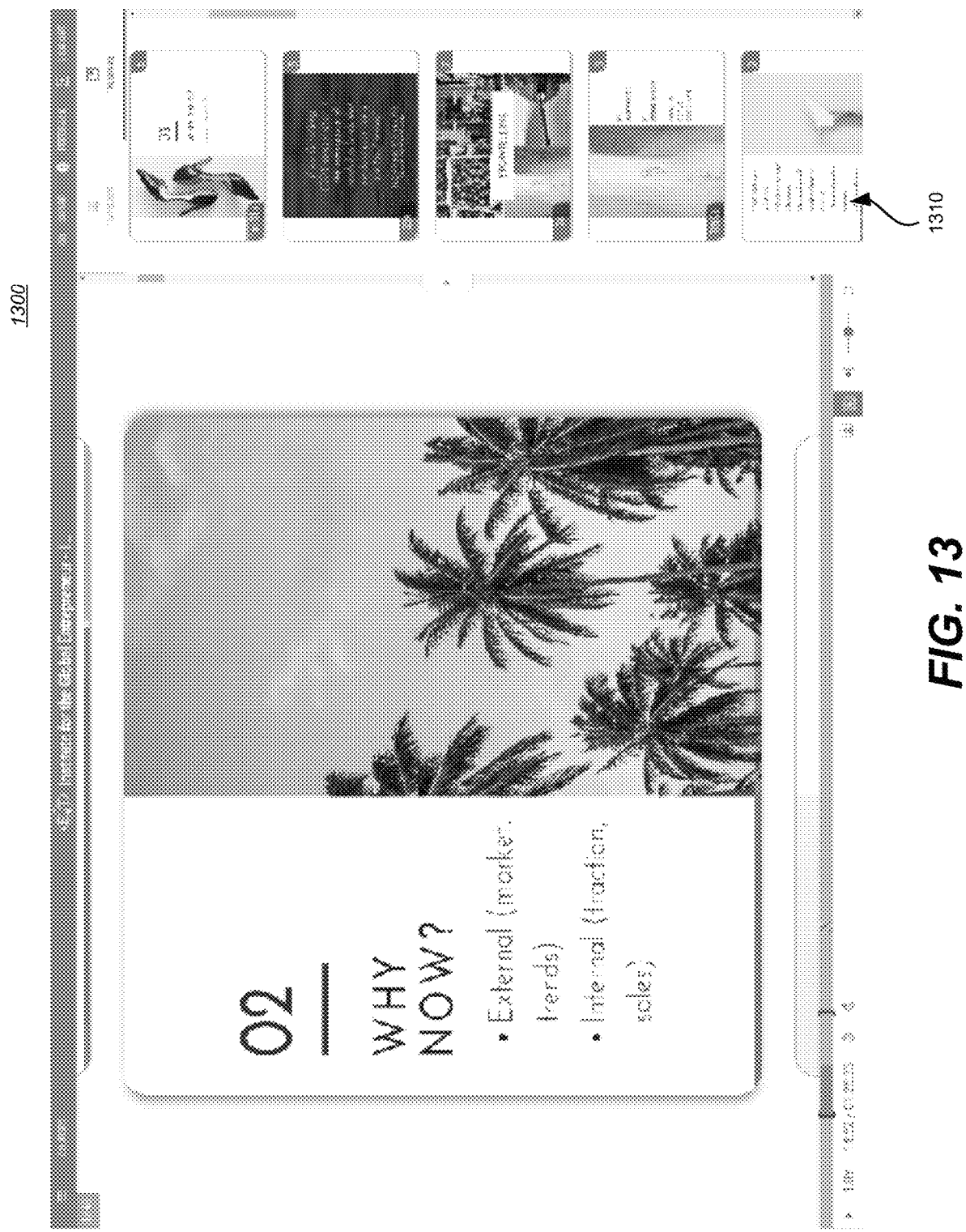
FIG. 13 is another view of an exemplary interface showing the rightmost pane with indexed ("thumbnailed) slide elements.

FIG. 13 is another view of an exemplary interface 1300 showing the rightmost pane with indexed slide elements (displayed as "thumbnails"). Interaction with different portions of the lecture can be invoked via selection by the user of one or more of the thumbnails, writing content (e.g., transcript, or linked words or topics in the slides themselves, etc.), or other media elements. Different panes may be invoked or made visible by selection of a pane button or annotator, to access the desired element or subject pane.

Figure 14:
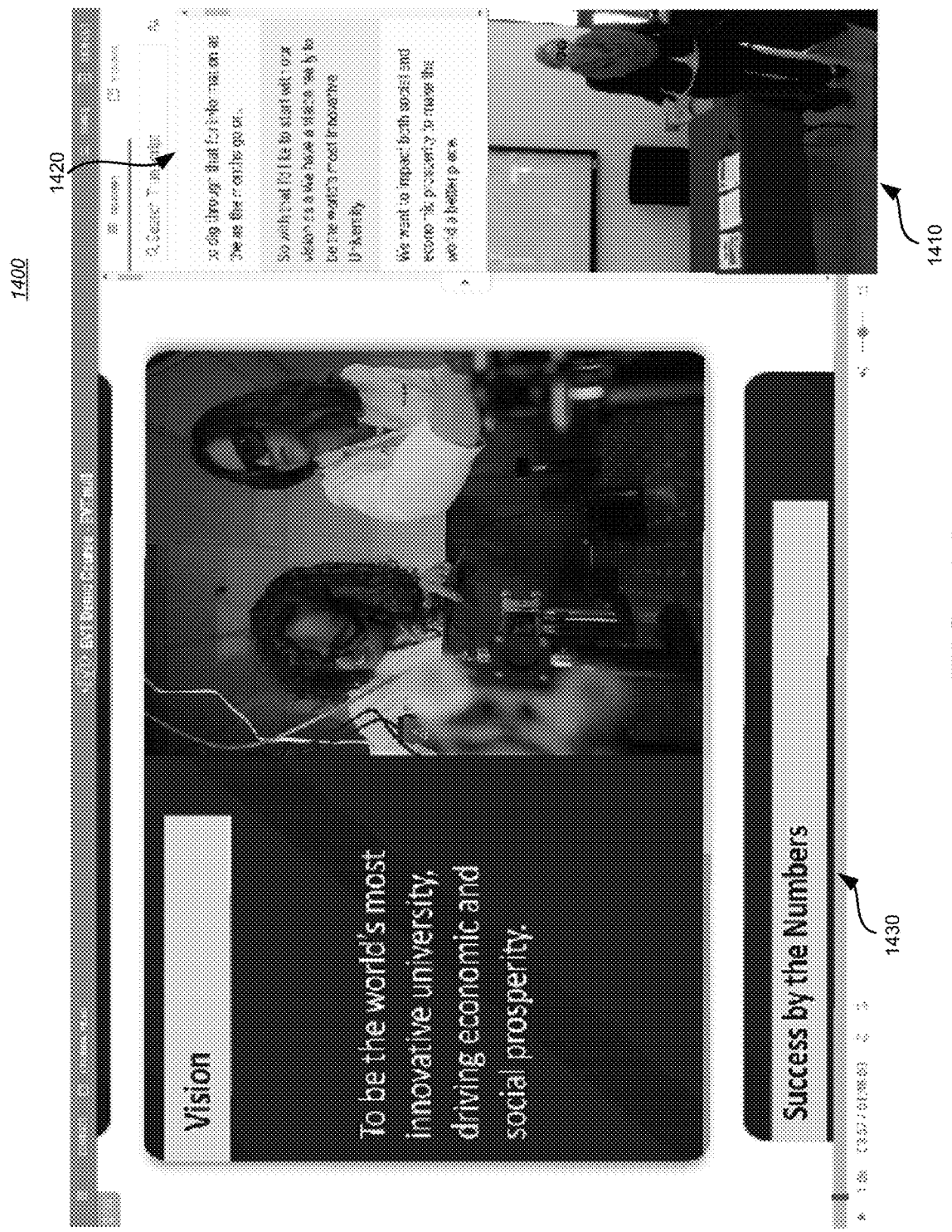
FIG. 14 is another view of an exemplary interface where the lecturer or presenter can be embedded in a separate side-located pane.

FIG. 14 is another view of an exemplary interface 1400 where the lecturer or presenter can be embedded in a separate pane 1410—off to the side, bottom, etc. This can be a cropped view that digitally tracks the lecturer to keep them in the lecturer pane 1410 view, as they move around. It is noted that a transcript pane 1420 is also shown, as well as the primary slide pane 1430.

Figure 15:
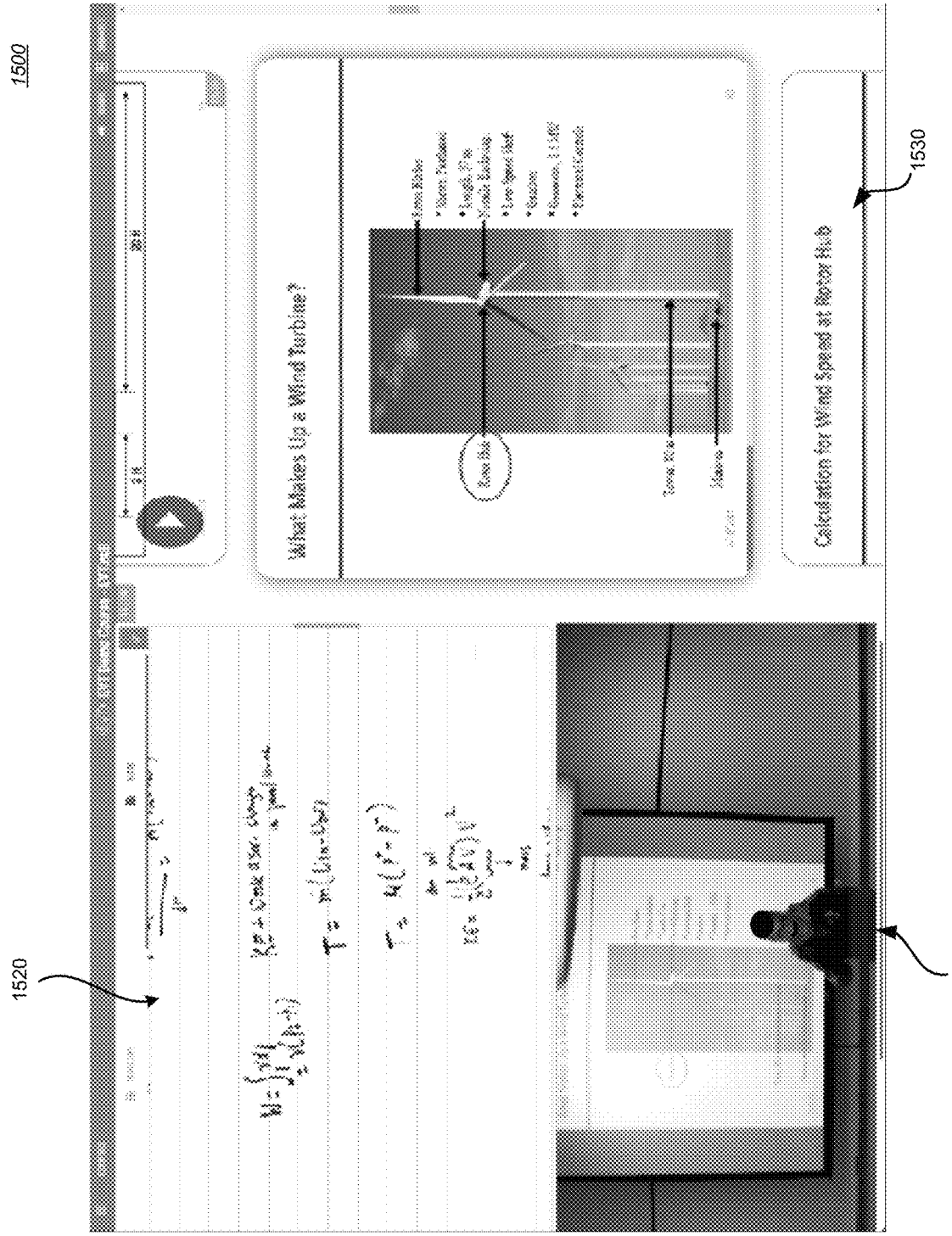
FIG. 15 is another view of an exemplary interface with a composite view containing a video pane, writing pane, and slide pane.

FIG. 15 is another view of an exemplary interface 1500 with a composite view containing a video pane 1510 (of lecturer), writing pane 1520 (of writing on a board or other surface from the lecturer), and slide pane 1530 (from a slide projector or computer device running a slide-like program). Also, it is noted that writing in writing pane 1520 can be processed by the exemplary system to actually create a slide—that is, the information added (via writing) by the lecturer can be formally presented as part of the slide presentation, perhaps noted via a different color, text type, etc., so as to distinguish it from the lecturer's slide materials.

FIG. 16 is another view of an exemplary interface 1600 showing modular aspects of the interface. For example, a video or image component 1610 can be shown with separate notes or images 1620 that are related to either the video 1610 or to the presenter's speech. The transcript portion of the speech is optionally not shown, as each component may, in some embodiments, be in a non-viewing state that the user or the system can make visible. Thus, various panes can be modularly "connected" to other panes to provide a comprehensive user interface, as according to implementation preference.

The above Figs. are illustrative of only some of the many capabilities of the exemplary system, additional features being described herein. Other possible modifications can be implemented such as having interconnections with other media. This can be in the form of an exemplary web interface which enables efficient access of information by interconnecting all "in-house" media to index each other (e.g., clicking on a word in the notes takes the user to the point in the video when the word was written and/or said) or "external" media (e.g., clicking brings up external sources, such as popular search databases, encyclopedias, technical articles, and so forth). For example, an "extracted" formula may be "linked" to other resources (e.g., Wikipedia, Wolfram, Google, etc.) for alternative representations and/or explanations on that formula. As is apparent, the interconnections can be time or topic based, can include other notes, other videos, transcripts, web uris, external video sites, comments by presenters and/or students, question and answers modules (internal and external), annotations and so forth.

Notes in the exemplary web interface can, in some embodiments, also be zoomable to better accommodate those with disabilities, searchable with text queries, adaptable to various displays, and so forth.

While most of the examples provided are in the scholastic context of a presentation on a board with "slides" (or equivalent), it is well understood that the various capabilities can be applied to a non-board scenario, for example a presentation at a business meeting, brainstorming between scientists, etc. Also, the one or more end "products" may also be manipulated by other add-on systems or cross-referenced with other similar (additional) products from other sources. As can be seen, this approach can also be applied to words, images, chemical formulas, shapes, music, etc.

Therefore, other possible uses and applications are only limited by the applicability of the various system and sub-systems described.

Accordingly, as will be appreciated by one skilled in the art, the present disclosure and of the hardware described above may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, microcode, etc.) stored in a tangible computer-readable memory device such as a tangible computer memory device, that in combination form a specifically configured apparatus that performs the functions as described herein. These combinations that form specially-programmed devices or software function blocks may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

The functional blocks, methods, devices and systems described in the present disclosure may be integrated or divided into different combinations of systems, devices, and functional blocks, as would be known to those skilled in the art.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method to automatically convert a presentation with slide materials to a digitized notetaking resource, comprising:
    inputting a media stream from a presentation to a compute server, the media stream containing a video of the presentation and an audio of the presenter's speech;
    performing a conversion of the media stream into a notetaking resource, the conversion comprising:
        segmenting the video into smaller segments;
        transcribing audio of the presenter's speech into text;
        associating a time stamp metadata to elements of the segmented video, the audio, and the transcribed text; and
        time ordering the elements of the segmented video, audio, and transcribed text;
    generating a composite user interface to view the notetaking resource, with one or more display panes, the interface having audio output controls;
    displaying in the one or more display panes, elements of the segmented video and transcribed text; and
    enabling a playback of the elements of the segmented video, audio of the presenter's speech, and transcribed text;
    wherein the displayed elements of the segmented video, audio of the presenter's speech, and transcribed text are time-matched, and wherein different times in the elements of the segmented video and transcribed text are selectable by a user, the selection causing the selected elements to be made prominent in the one or more display panes, with the audio of the presenter's speech also being time-matched to the selection.

2. The method of claim 1, wherein the video of the presentation includes images of presentation slides.

3. The method of claim 1, wherein the media stream further includes slide data from a slide presenting device.

4. The method of claim 3, further comprising:
    associating a time stamp metadata to elements of slide data;
    time ordering the elements of the slide data;
    displaying in the one or more display panes, elements of the slide data; and
    enabling a playback of the elements of the slide data,
    wherein the displayed elements of the slide data are time matched to at least one of a displayed elements of the segmented video and transcribed text, and when a different time selection is made by the user.

5. The method of claim 4, wherein a first pane of the one or more display panes is a view of the elements of the slide data and a second pane of the one or more display panes is a view of the elements of the transcribed text.

6. The method of claim 1, further comprising, concurrently displaying a plurality of elements of the segmented video in a video pane of the one or more display panes.

7. The method of claim 1, further comprising, displaying a plurality of elements of the transcribed text in a text pane of the one or more display panes.

8. The method of claim 4, further comprising embedding an image of a presenter in the displayed elements of the slide data.

9. The method of claim 8, wherein if the presenter overlaps with content of a videoed slide, making the presenter transparent; and
    if the presenter does not overlap with content of the videoed slide content, then embedding the presenter into spaces by at least one of identifying empty space in the content, extending a slide width, and moving separate videoed slides from each other to place the presenter.

10. The method of claim 1, further comprising:
    detecting in the video, if viewable, a presenter; and
    if the presenter overlaps with content of a videoed slide, making the presenter transparent; and
    if the presenter does not overlap with content of the videoed slide content, then embedding the presenter into spaces by at least one of identifying empty space in the content, extending a slide width, and moving separate videoed slides from each other to place the presenter.

11. The method of claim 1, further comprising:
    detecting in the video, if viewable, a presenter; and
    at least one of automatically reorientating the detected presenter to match a presenter's pointing gesture to scenery content which semantically corresponds to the transcribed text, and changing a dynamic perspective to focus to a head shot, an upper body shot, a partial or full body shot of the presenter based on a time duration, presentation, topic or punctuation.

12. The method of claim 8, further comprising, at least one of automatically reorientating the detected presenter to match a presenter's pointing gesture to scenery content which semantically corresponds to the transcribed text, and changing a dynamic perspective to focus to a head shot, an upper body shot, a partial or full body shot of the presenter based on a slide time duration, presentation, topic or punctuation.

13. The method of claim 10, further comprising tracking a position of the presenter and adjusting a displayed view to maintain the presenter within the displayed view.

14. The method of claim 1, wherein being made prominent is achieved by at least one of highlighting, altering an appearance, altering a size, altering a color, and altering a position within the one or more display panes.

15. The method of claim 1, further comprising, altering a portion of at least one of the elements of the segmented video and transcribed text, by at least one of simulating a laser pointer highlighting on the portion, rendering an animation pointing to the portion, and altering a color, type, size or characteristic of the portion.

16. The method of claim 4, further comprising, altering a portion of at least one of the elements of the slide data and transcribed text by at least one of simulating a laser pointer highlighting on the portion, rendering an animation pointing to the portion, and altering a color, type, size or characteristic of the portion.

17. The method of claim 4, further comprising creating a slide data corresponding to the transcribed text.

18. The method of claim 4, further comprising, placing thumbnails of different at least one of the elements of the video and elements of the slide data, in the one or more display panes.

19. The method of claim 4, further comprising, simultaneously displaying elements of the video, the transcribed text and the slide data in the one of more panes.

20. The method of claim 1, further comprising, providing a user level text editing capability in the notetaking resource, allowing the user to add their own notes.

21. The method of claim 4, further comprising, providing a user level text editing capability in the notetaking resource, allowing the user to add their own notes.

22. The method of claim 1, further comprising a word or topic search capability within the transcribed text.

23. The method of claim 1, further comprising, adding visible annotators in the one or more display panes, to allow the user to control at least one of zoom, fast forward, reverse, scroll down, scroll up, page up, page down, collapse, open, skip, volume, time forward, and time back.

24. The method of claim 1, further comprising, during playback, highlighting time-matching elements of at least one of the transcribed text and the slide data.

25. The method of claim 1, further comprising, automatically generating questions from at least one of the transcript, the slide data, and presenter-provided data.

26. The method of claim 25, further comprising testing a user with the generated questions.

27. The method of claim 1, further comprising:
  detecting in video of the presentation, writing on a writing surface;
  at least one of removing artifacts and enhancing the writing;
  identifying at least one of key frames and key groups in the writing;
  associating a time stamp metadata to one or more elements of the at least one key frames and key groups;
  time-ordering the one or more elements of the at least one key frames and key groups; and
  displaying in the one or more display panes the time-ordered one or more elements of the at least one key frames and key groups.

28. The method of claim 4, further comprising:
  detecting in video of the presentation, writing on a writing surface;
  at least one of removing artifacts and enhancing the writing;
  identifying at least one of key frames and key groups in the writing;
  associating a time stamp metadata to one or more elements of the at least one key frames and key groups;
  time-ordering the one or more elements of the at least one key frames and key groups; and
  displaying in the one or more display panes the time-ordered one or more elements of the at least one key frames and key groups.

29. The method of claim 28, further comprising, at least one of creating slide data from, enhancing, and animating one or more elements of the at least one key frames and key groups transcribed text or the transcribed text.

30. A system to automatically convert a presentation with slide images to a digitized notetaking resource, comprising:
  a compute server with software modules to convert input video, digital media and audio streams into a notetaking resource, comprising:
    a media analysis system containing a digital media analysis system module and at least one of a room analysis/other foreground detection module, writing surface detection module, person detector module, and writing detection/OCR module, and receiving input from images selected for analysis and AV feeds;
    a slide platform generation system module comprising:
      a presentation interval/slide element generator receiving input from the media analysis system and from images selected for analysis;
      a presenter embedding/slide element modulator module receiving input from the media analysis system and the presentation interval/slide element generator module;
      a slide element enhancement module receiving input from the presenter embedding/slide element modulator module; and
      a presenter enhancement/replacement module receiving input from the slide element enhancement module,
  wherein an output of the slide element enhancement module is slide elements/metadata data, and outputs of the presenter enhancement/replacement module is extracted/enhanced presenter data and slide elements with presenter embedded/metadata data,
  wherein all the output data is time stamped and comprise elements of the notetaking resource.

31. The system of claim 30, further comprising a composite user interface with one or more panes for displaying elements of the notetaking resource in a time ordered manner.

32. The system of claim 30, further comprising, a distribution server providing a user access to the notetaking resource.

33. The system of claim 30, further comprising, a video+audio muxer joining the input video, digital media and audio streams to form a single multimedia signal.

34. The system of claim 30, further comprising, a microphone device, video camera device, and display device, the devices providing input data for the video, digital media and audio streams.

* * * * *